(12) United States Patent
Blackwell et al.

(10) Patent No.: US 7,185,058 B2
(45) Date of Patent: Feb. 27, 2007

(54) METHOD AND SYSTEM FOR SENDING, RECEIVING AND MANAGING MESSAGING DATA

(75) Inventors: Jonathan Blackwell, Tracy, CA (US); Jason Kwan, Fremont, CA (US); Eric Chen, Curpertino, CA (US)

(73) Assignee: 2Point Communications, Inc., Tracy, CA (US)

( * ) Notice: Subject to any disclaimer, the term of this patent is extended or adjusted under 35 U.S.C. 154(b) by 0 days.

(21) Appl. No.: 09/944,699

(22) Filed: Aug. 31, 2001

(65) Prior Publication Data

US 2002/0183044 A1 Dec. 5, 2002

Related U.S. Application Data

(60) Provisional application No. 60/229,403, filed on Aug. 31, 2000.

(51) Int. Cl.
*G06F 15/16* (2006.01)

(52) U.S. Cl. ............... 709/206; 709/202; 709/203; 709/218; 709/250; 455/412; 455/414; 455/466

(58) Field of Classification Search ............... 709/205, 709/200–203, 206–207, 250, 217–219; 455/412–417, 455/445, 466
See application file for complete search history.

(56) References Cited

U.S. PATENT DOCUMENTS 5,557,730 A * 9/1996 Frid-Nielsen ............... 709/218
5,742,905 A * 4/1998 Pepe et al. .................. 455/417
5,956,521 A   9/1999 Wang
5,995,756 A * 11/1999 Herrmann ................... 709/216
6,223,213 B1 * 4/2001 Cleron et al. ............... 709/206
6,247,020 B1 * 6/2001 Minard ....................... 709/206
6,301,245 B1 * 10/2001 Luzeski et al. ............. 370/352
6,404,762 B1 * 6/2002 Luzeski et al. ............. 370/352
6,445,694 B1 * 9/2002 Swartz ....................... 370/352
6,463,462 B1 * 10/2002 Smith et al. ................ 709/206
2002/0032769 A1 * 3/2002 Barkai et al. ............... 709/224

* cited by examiner

*Primary Examiner*—Bharat Barot
(74) *Attorney, Agent, or Firm*—Cooper & Dunham LLP

(57) ABSTRACT

A system and method of sending, receiving and managing messaging data through a shell interface is provided. The system includes a plurality of communication services, at least one messaging client and a host server. The plurality of communication services provides fax, voicemail and/or pager messaging services. The host server provides an interface between the messaging client and the plurality of communication services. The messaging client has a shell interface. A messaging component is installed into the shell interface. At least one messaging entry is displayed through the shell interface. The displayed messaging entry identifies received faxes, voicemails and/or pager messages. One of the received faxes, voicemails and pager messages is selected through the shell interface, and an appropriate communication service is invoked for accessing the selected message.

20 Claims, 24 Drawing Sheets

FIG. 1
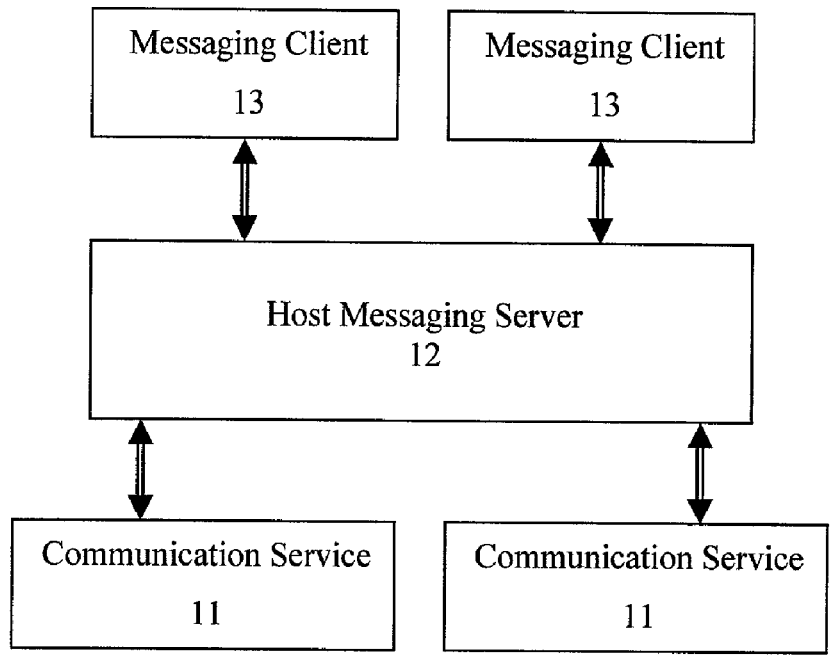
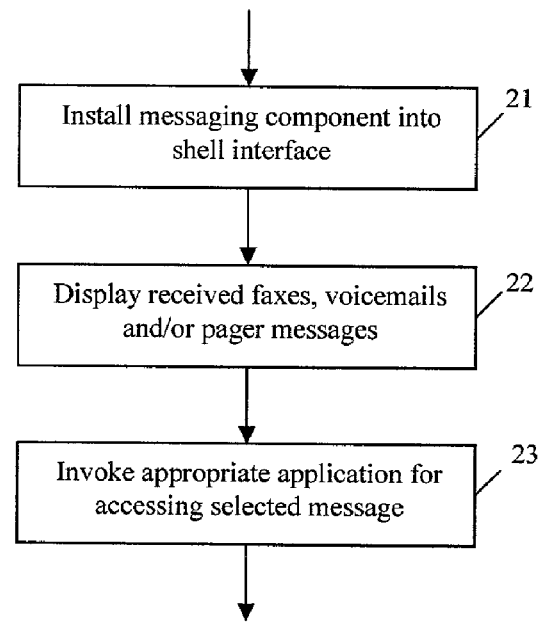
FIG. 2

METHOD AND SYSTEM FOR SENDING, RECEIVING AND MANAGING MESSAGING DATA

CROSS-REFERENCE TO RELATED APPLICATIONS

This application claims the benefit of provisional application Ser. No. 60/229,403, filed Aug. 31, 2000, now abandoned, and entitled "METHOD AND SYSTEM FOR SENDING, RECEIVING AND MANAGING MESSAGING DATA."

TECHNICAL FIELD

The present disclosure relates to sending, receiving and managing messaging data and, more specifically, to adapting an operating system component such as a shell interface to provide a user with easy-to-use means for sending, receiving and managing messaging data.

DESCRIPTION OF THE RELATED ART

Electronic mail (i.e. e-mail), facsimile (fax), voicemail and paging have become popular means for message communication. Computer operating systems now typically include software interfaces and/or follow defined protocols which facilitate control of communication hardware in a computer system by application software which utilize these and other modes of message communication.

For example, Telephone Application Programming Interface (TAPI) is a set of software routines in Windows-based operating systems that may be used by application software to control modems and other telephony devices in order to communicate through those devices. TAPI supports both speech and data transmission, allows for a variety of terminal devices, and supports connection types and call management techniques such as conference calls, call waiting, and voice mail.

Messaging Application Programming Interface (MAPI) is a set of routines in a dynamic link library (DLL) that may be used by application software (such as word processors, spreadsheets, graphic programs, etc.) to send, receive and monitor messages (e.g., e-mail) to and from another device on a network. Applications which employ simple MAPI use a subset of the messaging functions. Extended MAPI applications use a comprehensive set of the messaging functions. Post Office Protocol (POP) and Simple Mail Transfer Protocol (SMTP) are two protocols for e-mail communication.

Software fax, voicemail and/or pager solutions typically are implemented through one of the following means: (a) integration into e-mail; and (b) independent applications or services. Each approach is less than facile from the user's perspective.

One approach for a software fax, voicemail and/or pager solution is to integrate such services into an e-mail product to provide a user with a single tool for sending and/or receiving fax, voicemail, pager and/or e-mail messaging data. This approach has its disadvantages. For example, users may be burdened with the additional cost of purchasing the client program, and may be required to learn and understand the program. In addition, integration of the plurality of communication services in the client program present additional support and development issues. In some instances, the e-mail client program may not integrate well with the additional services. Further, user demands/markets may require integration of the fax, voicemail, pager and/or contact messaging services into more than one e-mail client program.

Alternatively, independent applications or services may be provided for fax, voicemail, pager and/or contact messaging. Such applications, however, typically provide graphical representation of the messages independent of core operating system components. The human interface for such an application usually is a software program developed solely for this purpose, and therefore users need to learn to use the interface(s). Also, such messaging services are made available (e.g., presence of messages is identified) only when the user executes the application program.

Many operating systems, such as the various flavors of Windows (e.g., Windows95, Windows98, Windows2000, WindowsNT, WindowsCE, WindowsXP, etc.), Unix (e.g., Linux, SUN OS, Solaris, HP-UX) and Macintosh (e.g., MacOS, iMac, iBook, etc.), provide a shell interface, which allows the user/programmer to communicate with the operating system via standard input and output devices (e.g., mouse, keyboard, display, touchscreen, etc.). The shell interface may be used to explore file resources or media resources, as well as to explore the Internet (or some other network) or remote network storage sites such as FTP (File Transfer Protocol) servers. The shell interface also may be used for managing synchronization of data and for task scheduling.

SUMMARY

The present disclosure provides a method of sending, receiving and managing messaging data through a shell interface, including, in accordance with one embodiment, installing a messaging component into the shell interface, displaying at least one messaging entry using the shell interface, the displayed messaging entry identifying received faxes, voicemails and/or pager messages, and invoking an appropriate communication service for accessing a selected one of the received faxes, voicemails and pager messages, wherein the selected message is selected through the shell interface.

The disclosure also provides a system of sending, receiving and managing messaging data, including, in accordance with one embodiment, a plurality of communication services providing fax, voicemail and/or pager messaging services, at least one messaging client having a shell interface with a messaging component to display at least one messaging entry through the shell interface, and a host server providing an interface between the at least one messaging client and the plurality of communication services. The displayed messaging entry identifies received faxes, voicemails and/or pager messages. One of the received faxes, voicemails and pager messages may be selected through the shell interface, and an appropriate one of the communication services is invoked by the messaging client for accessing the selected message. The invoked communication service may provide an appropriate viewer, such as a voice message viewer, a pager message viewer or a fax message viewer. The displayed messaging entry may show that a received fax, voicemail and pager message is an attachment to an e-mail message.

The method may further include displaying a second messaging entry through the shell interface. The second messaging entry may (a) identify sent faxes, voicemails and/or pager messages, (b) identify outgoing faxes, voicemails and/or pager messages, and/or provide contact data.

The messaging component adds a easy-to-use user interface accessible through the shell interface which may include (a) a compose message user interface, (b) a status monitor user interface, and (c) a messaging properties user interface accessible through the shell interface for managing mailboxes (and means for viewing and changing settings for the mailboxes).

The messaging component, according to one embodiment, installs a messaging shell namespace. The messaging component may be maintained in a dynamic link library.

The messaging component to be installed may be embodied in a computer program (or some unit of computer code, i.e. instructions to which the computer responds, such as a code block, code element or code segment) stored on a computer readable medium, such as a compact disc (CD), and/or transmitted via a computer network, such as the Internet, or another transmission medium, such as a wireless medium.

BRIEF DESCRIPTION OF THE DRAWINGS

The features of the present disclosure may be more readily understood from the following detailed description by referring to the accompanying drawings wherein:

FIG. 1 shows a block diagram corresponding to a system, according to an embodiment of the present disclosure, for sending, receiving and managing messaging data;

FIG. 2 shows a flow chart of a method, according to an embodiment of the present disclosure, for sending, receiving and managing messaging data;

DETAILED DESCRIPTION

Figure 3:
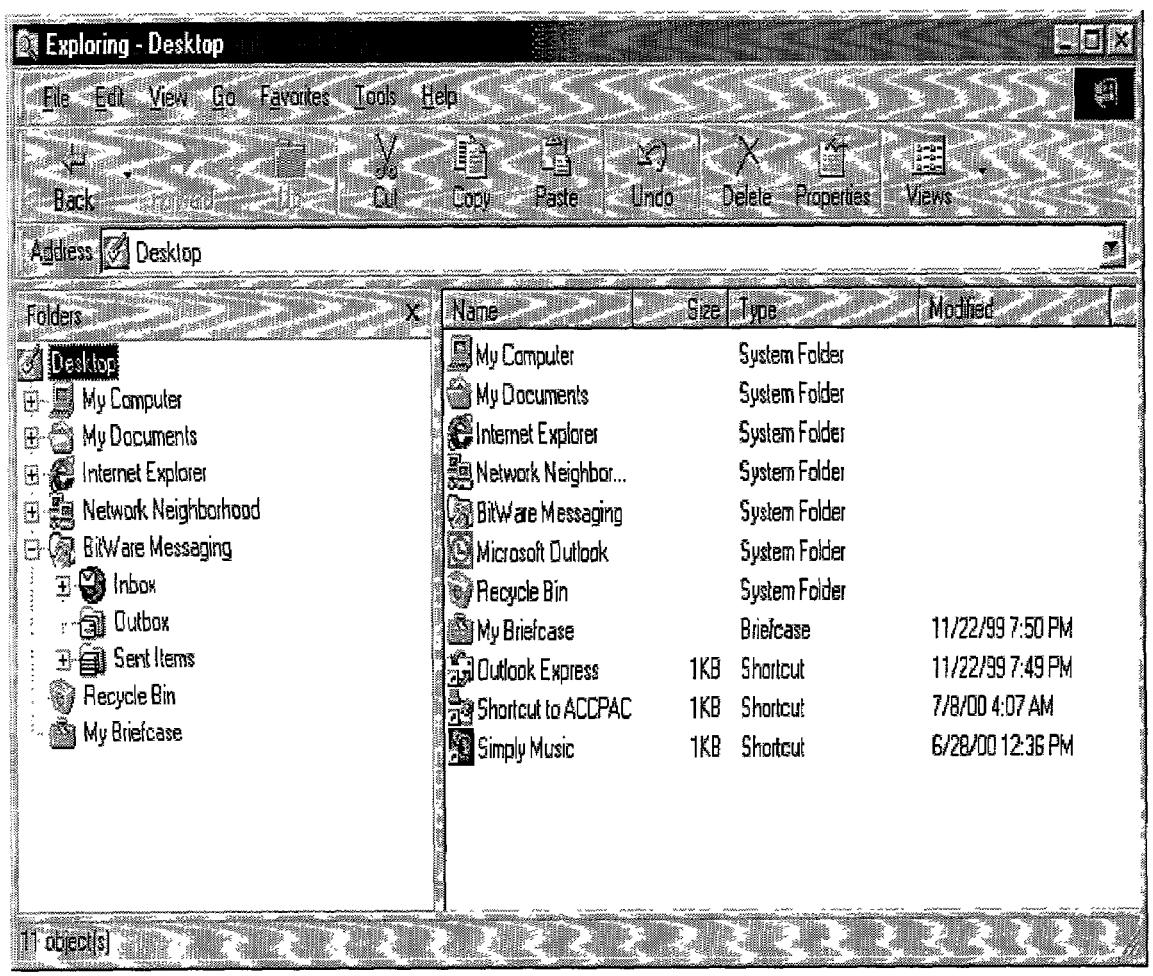
FIG. 3 is a snapshot view of a messaging entry under a Desktop entry, in accordance with an embodiment of the present disclosure.
Figure 4:
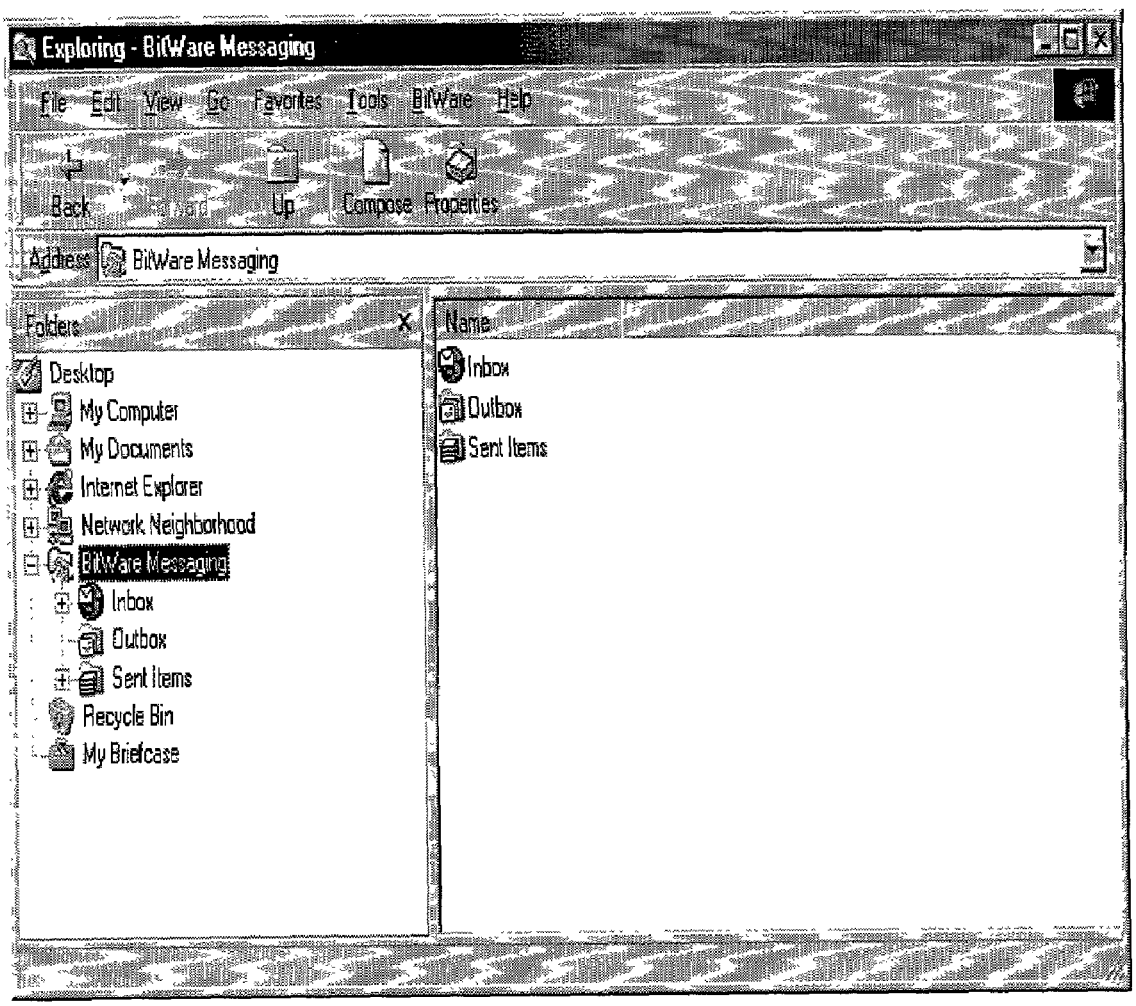
FIG. 4 is a snapshot view of folders in a messaging entry which appear on Explorer's right-hand pane, in accordance with an embodiment of the present disclosure.
Figure 5:
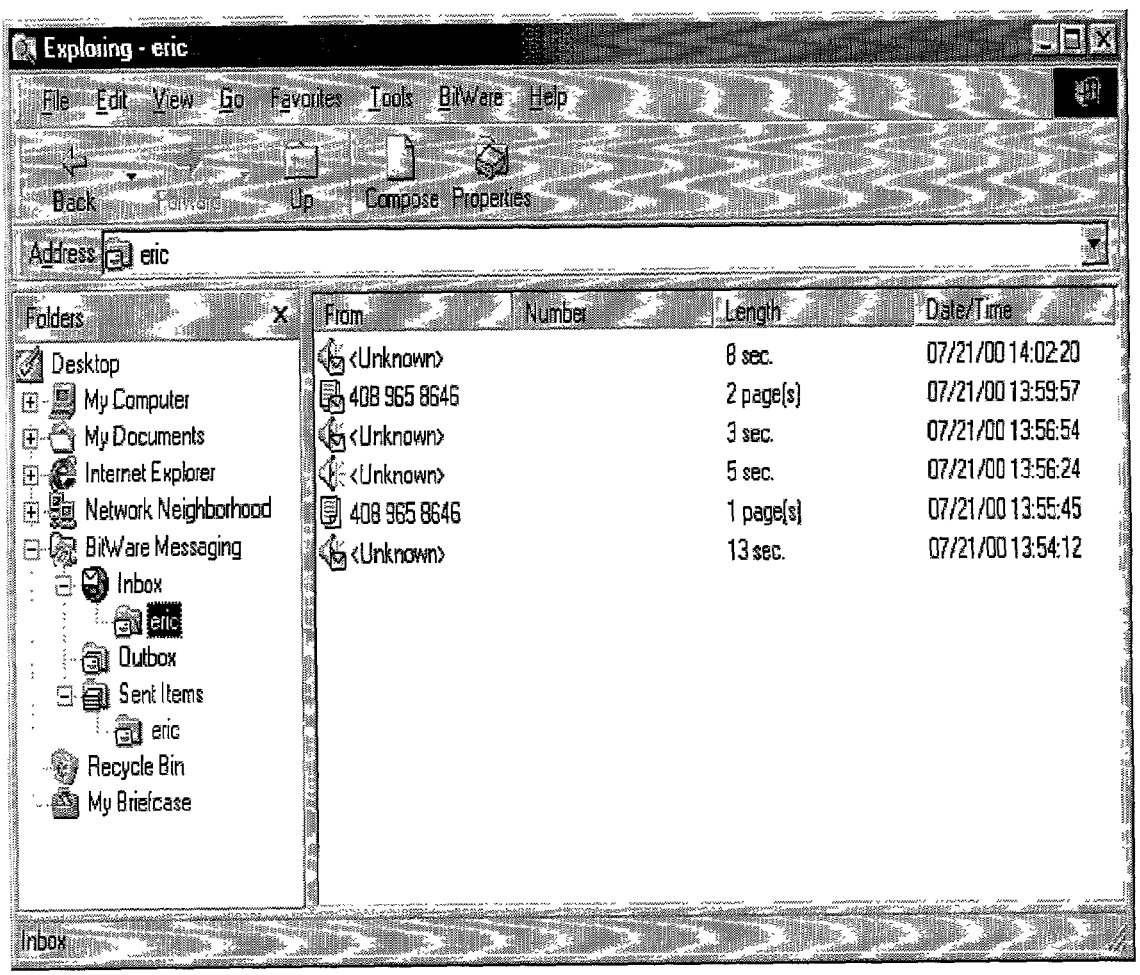
FIG. 5 is a snapshot view of messages in an inbox folder which appear on Explorer's right-hand pane, in accordance with an embodiment of the present disclosure.
Figure 6:
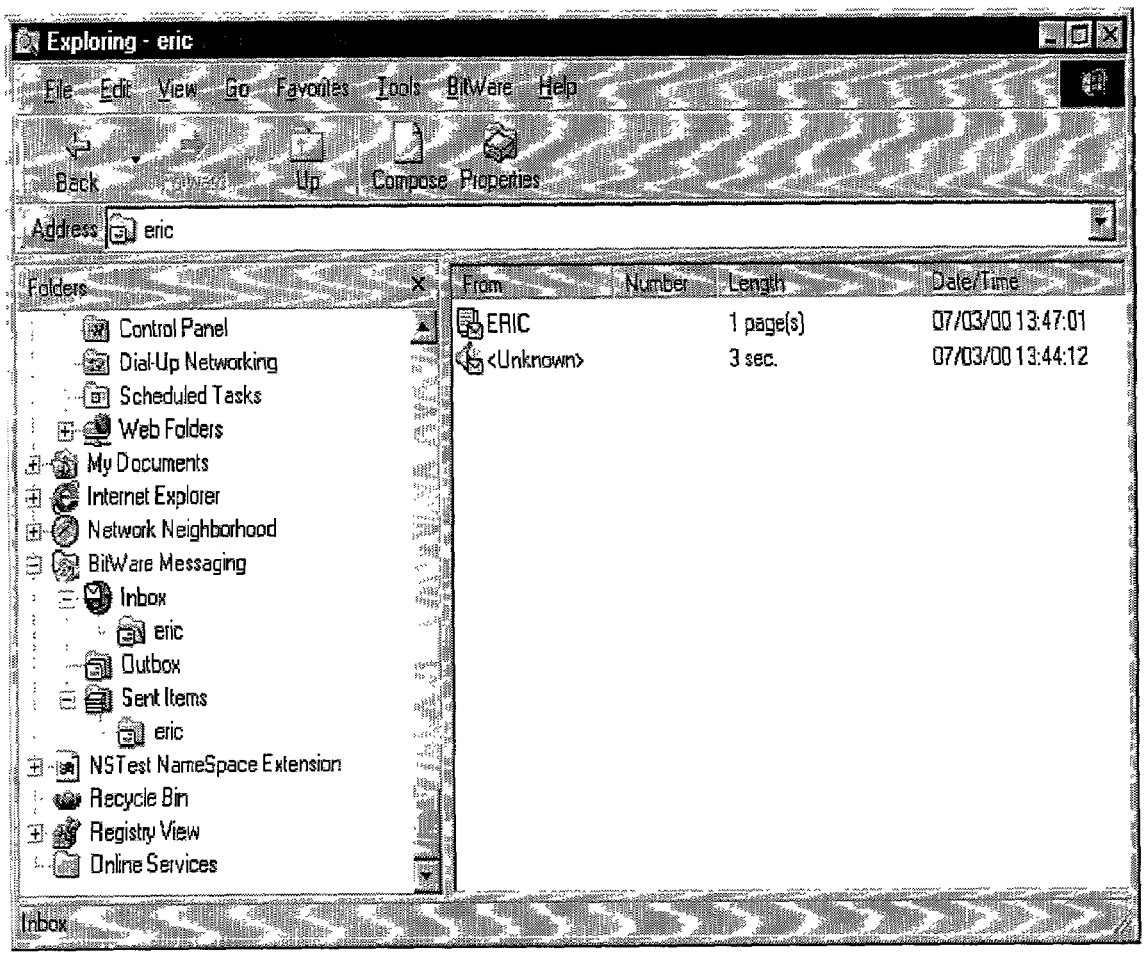
FIG. 6 is another snapshot view of messages in an inbox folder which appear on Explorer's right-hand pane when the inbox folder is selected, in accordance with an embodiment of the present disclosure.
Figure 7:
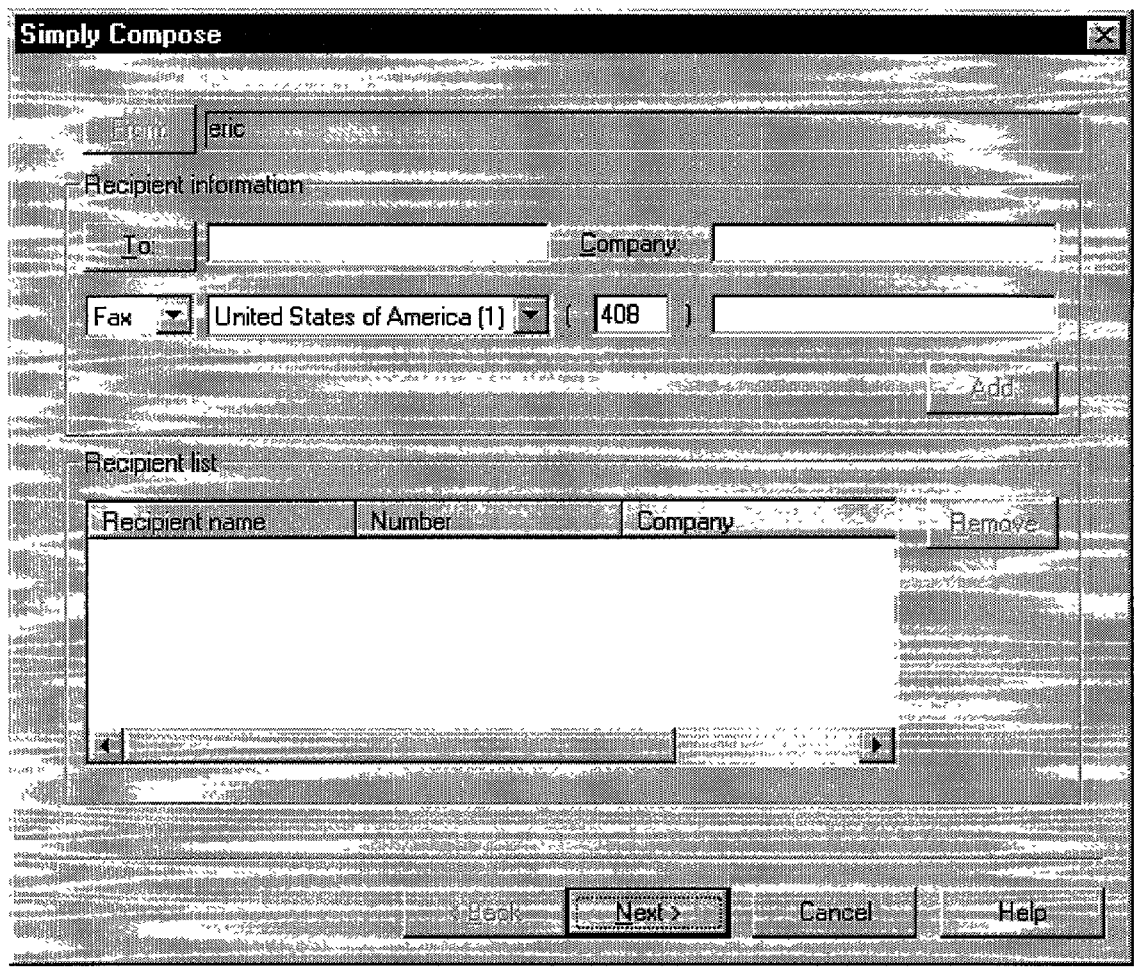
FIG. 7 is a snapshot view of a compose message user interface, in accordance with an embodiment of the present disclosure.

The present disclosure provides a new method and system of providing messaging services, such as sending, receiving and managing messages, and managing contacts, using components of an operating system. The functions of sending, receiving and managing messages and managing contacts may be integrated into a shell interface provided by an operating system. The messaging services are integrated into the shell interface to provide a messaging application that is flexible to expand and may be widely available and used. Since users typically are familiar with the shell interface, the learning curve to manage messaging data, in accordance with the teachings of the disclosure, may be reduced considerably.

A system 10, in accordance with one embodiment shown in FIG. 1, comprises a plurality of communication services 11, a host messaging server 12 and at least one messaging client 13. The system is described in more detail below. FIG. 1 shows two messaging clients. It would be apparent to one skilled in the art, however, that the system may be readily adapted to include one or more (e.g., three, four, etc.) messaging clients, with a limit on the number of clients being dependent on the capacity of the host messaging server. Analogously, the system may be adapted to include one or more communication services.

A method for sending, receiving and managing messaging data, according to an embodiment of the present disclosure, will be described with reference to FIGS. 1 and 2. A messaging component is installed into a shell interface of the messaging client (step 21). At least one messaging entry is displayed through the shell interface of the client interface (step 22). The messaging entry identifies faxes, voicemails and/or pager messages received through the communication services via the host server. An appropriate communication service is invoked for accessing a selected one of the received faxes, voicemails and pager messages by the messaging client through the host server (step 23).

An example of the method and system of the present disclosure, as implemented on a Windows platform, will be described below with reference to FIGS. 3–25. In the Windows environment, Windows Explorer is provided as a shell interface. Message management and communications of, for example, fax, voice, pager and e-mail messaging data (and contact data), may be integrated into the Explorer shell interface, as described below. Macintosh and Unix platforms also provide a shell interface. The method and system described herein for sending, receiving and managing messaging data also may be adapted to apply to such platforms, as would be apparent to persons of ordinary skill in the art after reading this disclosure.

A shell namespace extension, referred to herein as Messaging Component, may be provided to specifically manage and unify users' messages through the Explorer shell interface. Integration of the Messaging Component with the Explorer shell provides message management using namespace in addition to the components that come with Windows, and allows the user to view additional data, such as fax messages, voice mail messages, page messages, e-mail messages or contact data. The data component viewed within the shell extension further may be extended to include video data. With these tools integrated into the Explorer shell interface, users have an easy-to-use means, with which they likely are already familiar, for managing, accessing and communicating multi-media messages.

During installation, the Messaging Component module is properly copied and configured so Explorer is able to find and load it automatically. For example, the Messaging Component may be installed as a COM (Component Object Model) component to the Windows system. With proper configuration, Explorer automatically loads the Messaging Component, installs a messaging shell namespace into the Windows system, and operates its underlying implemented functions as part of the Explorer interface. The Messaging Component may be in DLL (Dynamic Link Library) format.

Not only the different message media types that users may access, but also where and how users access them may be integrated into Explorer. Once loaded by Explorer, as shown for example in FIG. 3, a Messaging Component entry (identified as "Bitware Messaging" in FIG. 3) shows up under the user's Desktop entry on the lefthand treeview pane of Explorer. Other types of integration of the Messaging Component into Explorer also may be provided, including, for example, the following: (i) addition of two Messaging Component function buttons, "Compose" and "Properties", on Explorer's tool bar, as shown exemplarily in FIG. 4; and (ii) addition of a menu item ("Bitware" in FIG. 4) on Explorer's menu bar, plus two submenu items, "Compose" and "Properties". Additional menu items may be provided depending on the type of view to be displayed on the right-hand listview pane of Explorer.

A number of folders may be displayed under the Messaging Component entry. In one embodiment, the Messaging Component entry may include an InBox folder, a Sent Items folder and an OutBox folder (shown for example in FIG. 4), as well as a contact data folder (not shown). When one of these folders is selected, the right-hand pane of the Explorer shows the detailed context-sensitive data of the selected folder, as shown, for example, in FIGS. 5 and 6. Each folder registers its icons, display name and implemented functions into Explorer. When the Inbox folder is selected (e.g., double-clicked), it expands and shows one or more users' Messaging Component inbox folders. When one of the users' inbox folders is selected, incoming messages in the selected folder are displayed on Explorer's right-hand pane. When the OutBox folder is selected, outgoing messages, including any fax, pager and voice messages, that are being serviced are displayed. When the Sent Items folder is selected, the folder is expanded and shows one or more users' sent items folder. When one of the users' sent items folders is selected, specified ones of the user's outgoing messages that had been sent are displayed on Explorer's right-hand pane.

For each received message, identifying information associated with the message may be displayed. For example, in FIGS. 5 and 6, information identifying the sender of the received message, when available, maybe displayed. Also, the length of the message and the date and time the message was received may be displayed.

Different message viewers may be invoked based on the type of message to be viewed. For example, a fax viewer, a voice message viewer and a pager message viewer may be provided.

An alternative embodiment of the hierarchy of folders under the Messaging Component entry is shown below:

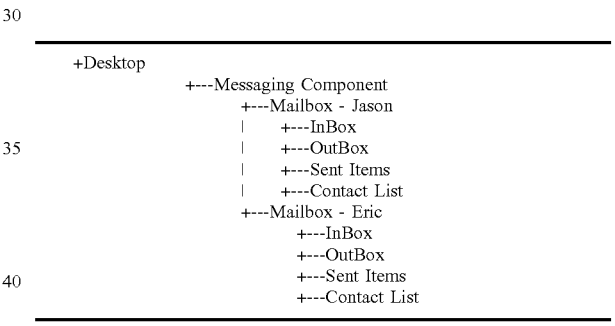

In this embodiment, each user has a corresponding Mailbox folder. Each user's Mailbox includes an Inbox folder, a Sent Items folder, an OutBox folder and a Contact List folder.

Context menus may be provided based on the types of entries. Thus, the following menu functions maybe provided for corresponding items: (a) for opened items, Compose, Properties and functions; (b) for inbox, mailbox, outbox and sent items folders, Open and Explore; (c) for inbox messages, Open, Forward and Delete; (d) for outbox messages, Open, Cancel Job and Reschedule; (e) for sent items messages, Open, Resend, Forward and Delete.

The native client interface may include a step-by-step compose messages user interface. For example, a wizard style Compose form, as shown for example in FIG. 7, may be provided. The compose messages user interface displays the necessary user interface pages selected based on the recipient type(s). The recipient types include Fax, Voice and/or Pager.

A description of additional features which maybe integrated with the Messaging Component will be provided below.

Figure 8:
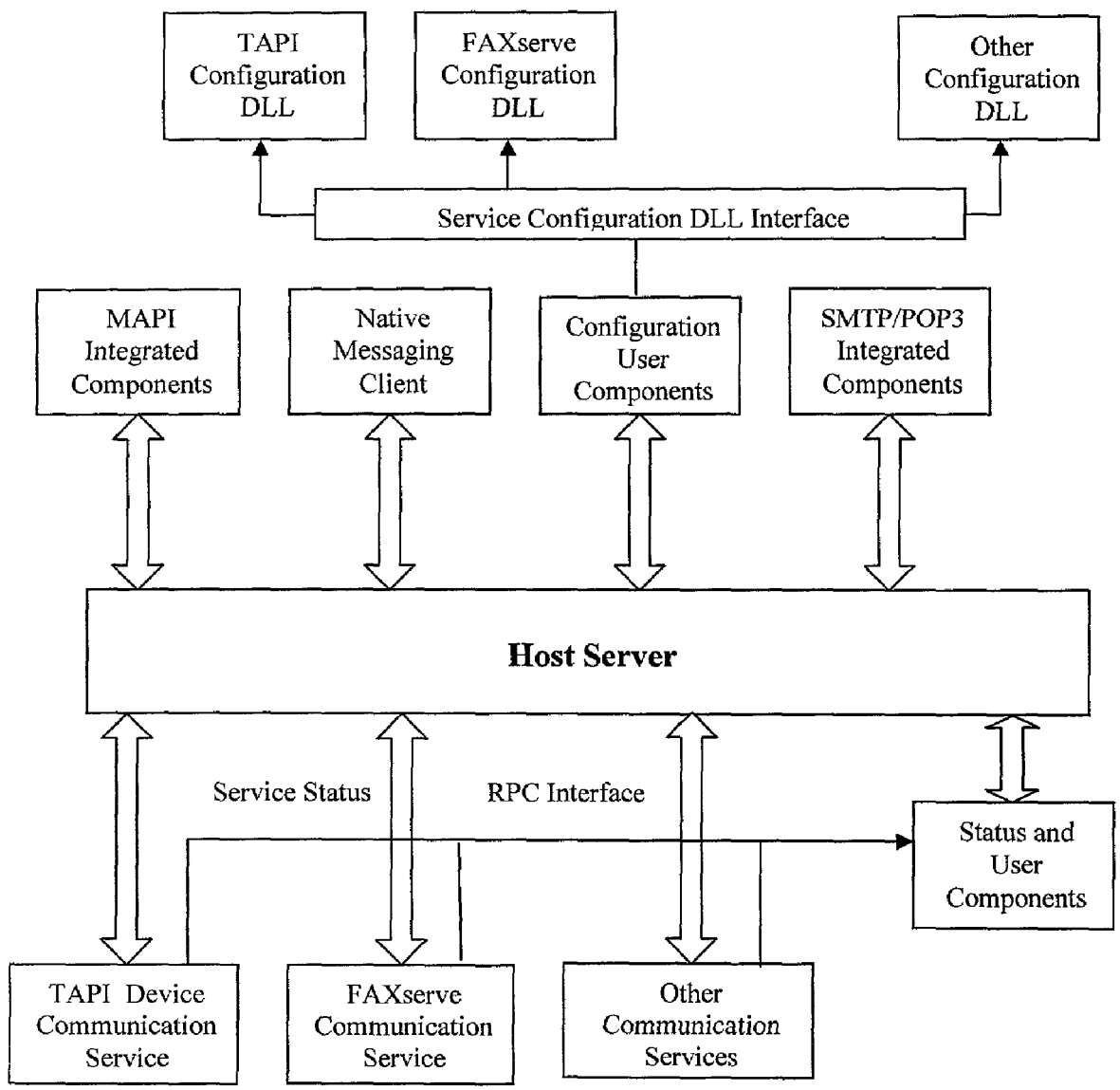
FIG. 8 is a block diagram corresponding to a system, according to another embodiment of the present disclosure, for sending, receiving and managing messaging data.
Figure 9:
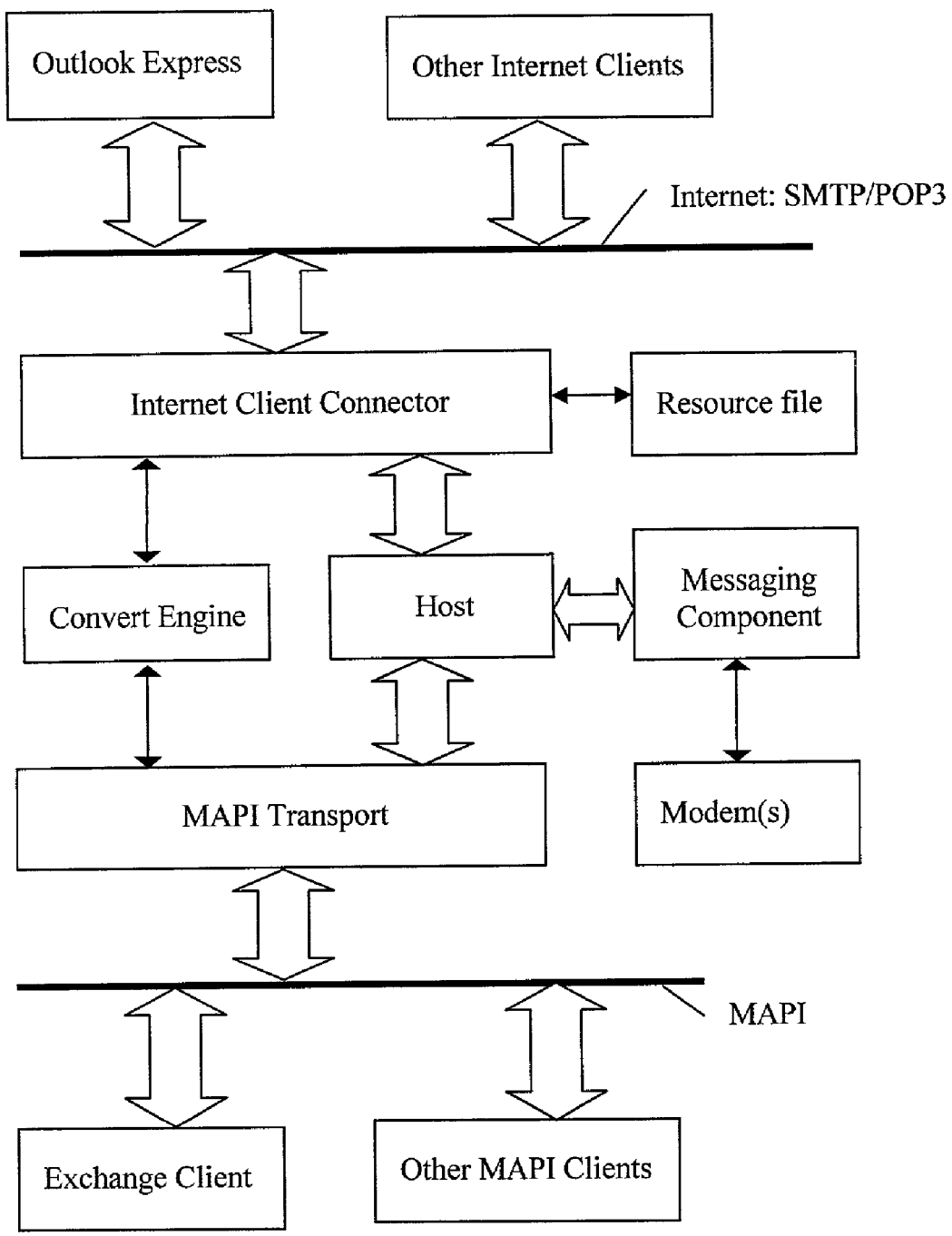
FIG. 9 is a block diagram showing an example of integration of an Internet client connector with Internet e-mail system and MAPI messaging systems, in accordance with an embodiment of the present disclosure.
Figure 10:
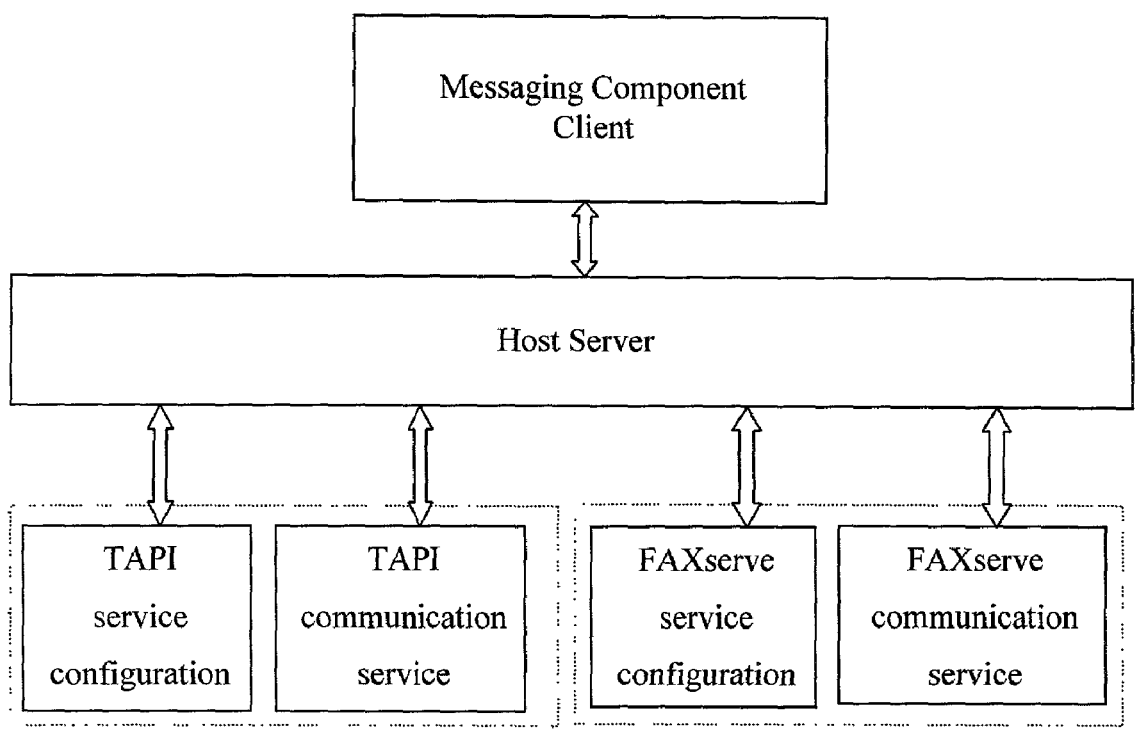
FIG. 10 is a schematic view of interaction between a messaging client and configuration and communication components through a host interface, in accordance with an embodiment of the present disclosure.

FIG. 8 shows a system in accordance with another embodiment of the present disclosure for sending, receiving and managing messaging data. While Messaging Component may be configured as a desktop product, an embodiment which employs client/server modeling will be described below.

The Messaging Component may be installed in one of many types of client integrations, including the following: Windows Explorer; Outlook/Exchange extended MAPI (Message Application Programming Interface); Outlook Express; and Outlook simple MAPI. Also, a native client that allows users to use the Messaging Component without any MAPI messaging requirement may be provided.

The available types of installation may be provided via a user interface for selection during the setup procedure. The Messaging Component may be configured to run under any of the following environments: desktop; laptop; and workgroup. The Messaging Component may detect and provide best installation options during setup. Alternatively, the installation type may be pre-defined by modifying the SETUP.INI without showing a selection user interface. Flexible installation options may be provided by modifying the SETUP.INI file. For example, it may be installed to provide voice/fax with Explorer client integration. By appropriately modifying the SETUP.INI file, the voice feature may be removed to provide fax-only without code re-compilation.

The Messaging Component may be configured to be compliant with extended or simple MAPI integrations. Thus, an address book template, transport service provider, message hook service provider, message forms, synchronization extension and a command extension may be provided. The address book service provides a user with means to create voice/fax/pager phone number entries in one single user interface page. The transport service provides delivery services (send and receive) between the Messaging Component and the messaging front-end. The message hook service provides means to manage the user mailboxes and messages from a messaging front-end by auto-creating subfolders for organization. The form provider provides users with means to view easily the different types of messages such as incoming voice messages, pager messages or faxes in a native view. The synchronization extension synchronizes the messaging inbox having read-and-deleted messages with those in the Messaging Component host. The command extension provides menu items to invoke a message compose form. A preview extension also may be provided for previewing messages.

Messaging Component client integration may be performed with Internet mail client application. The Messaging Component may be integrated as an Internet client with SMTP and POP3 (Post Office Protocol version 3) components. Thus, fax and voice messages may be sent and received as a SMTP/POP3 messaging client. The messages may be delivered as attachments. The SMTP and POP3 servers run locally.

The Messaging Component may be compliant with TAPI, and support multiple TAPI devices simultaneously. The Messaging Component also may be compliant with Advanced Configuration and Power Interface (i.e. an interface specification for operating-system directed power management and system configuration) for sending and receiving faxes via TAPI devices.

The pager service (not shown in the figures) maybe adapted to comply with TAP (Telocator Alphanumeric Protocol) protocol and/or other pager protocols, such as UCP-SMS (Universal Computer Protocol-Short MessageSystem), SMS-TAP, etc.

The Messaging Component may include core server components, client components, client integration components, and service components.

The server components of the Messaging Component may include a component that performs data transactions and fax services, and run, for example, as an NT service under Windows NT and an application service under Windows 95/98. The server component may provide multiple client connections as well as multiple communication service connections.

The Messaging Component may include the following client components: a shell namespace extension component; a status monitor component; a properties component; a compose component; a helper component; a phone component; a voice message component; a fax viewer component; a terminal component; an attachment rendering component; and a cover page converter component. The shell namespace extension component identifies, and provides the identity of, the contents of user's inbox, outbox and sent items for display in Explorer. The status monitor component monitors the status of communication devices so that a job list and device status maybe displayed. The user may be provided with means for choosing the different functionalities via, for example, tray-icon pop-up menu, program menu, toolbar, etc. The properties component provides the user with means to add and manage mailboxes, and view and change settings for mailboxes. The compose component provides a user interface for composing messages. The helper module executes Windows service components. The voice message component provides a form viewer for voice messages. The terminal component provides the user with means to send and receive files to and from a bulletin board system (BBS), communicate via chat modes, invoke script files and macro keys and perform remote dial-up functions.

The fax viewer component provides a viewer for viewing and annotating received faxes. Image copy/paste functions maybe provided in annotation mode. The viewer may have a zoom function. When the viewer is opened the first time, the zoom setting may be set to FIT_TO_WIDTH. The zoom setting may be stored, so that the next time that the viewer is opened the stored zoom setting may be applied.

The Messaging Component may include the following client integration components: a connector module; an address book provider module; a conversion module; a transport service provider module; a message service module; an inbox synchronization extension module; a MAPI extension module; a fax communication module; an image and script module; a MAPI support DLL module; and a message preview module.

The conversion module converts address book entries from the address book provider module to entries in the personal address book for Outlook or Exchange or Windows Address Book (WAB) for Outlook Express. The Messaging Component may be configured for MAPI Personal Address Book (PAB) integration and WAB integration. Reverse WAB lookup based on name may be performed when an address type is invalid.

The connector module connects the Messaging Component with an Internet client (e.g., Outlook Express). A function of Internet client connector (ICC) is to enable an Internet e-mail client to send and receive fax, pager and voice messages through the Messaging Component. The ICC may provide outbound service using SMTP and inbound service using POP3. The Internet client may compose and submit a fax, pager, or voice message to the ICC's SMTP interface similar to a standard e-mail. Integration of the ICC with an Internet e-mail system and MAPI messaging systems is shown exemplarily in FIG. 9. A tight integration with the e-mail client application may be provided to make the Messaging Component seamlessly integrated as the unified messaging solution for the operating system. The ICC may reside in the client workstation as a standard local host, and serve as a message transport between the Internet client applications and the Messaging Component.

The Messaging Component may include the following service components: communication service components; and user interface components. The communication service components provide communication services for faxing via TAPI devices, manage TAPI devices in the local machine and provide a user interface for the fax services. The user interface components provide a user interface for the client properties component.

The Messaging Component provides simultaneous handling of multiple messaging services. Since a client/server architecture may be used, the Messaging Component provides expandable communication services. In order to support different communication devices or services, a standard Remote Procedure Call (RPC) interface may be provided. With the add-in service, the communication devices through corresponding communication services may be utilized to transmit/receive faxes, broadcast voice messages and transmit pager messages.

The services may include configuration and communication components. The configuration component handles property display and configuration for communication devices or servers. The communication component handles data transmission and receive. The components interact with the Messaging Component client through the host interface, as shown for example in FIG. 10.

Figure 11:
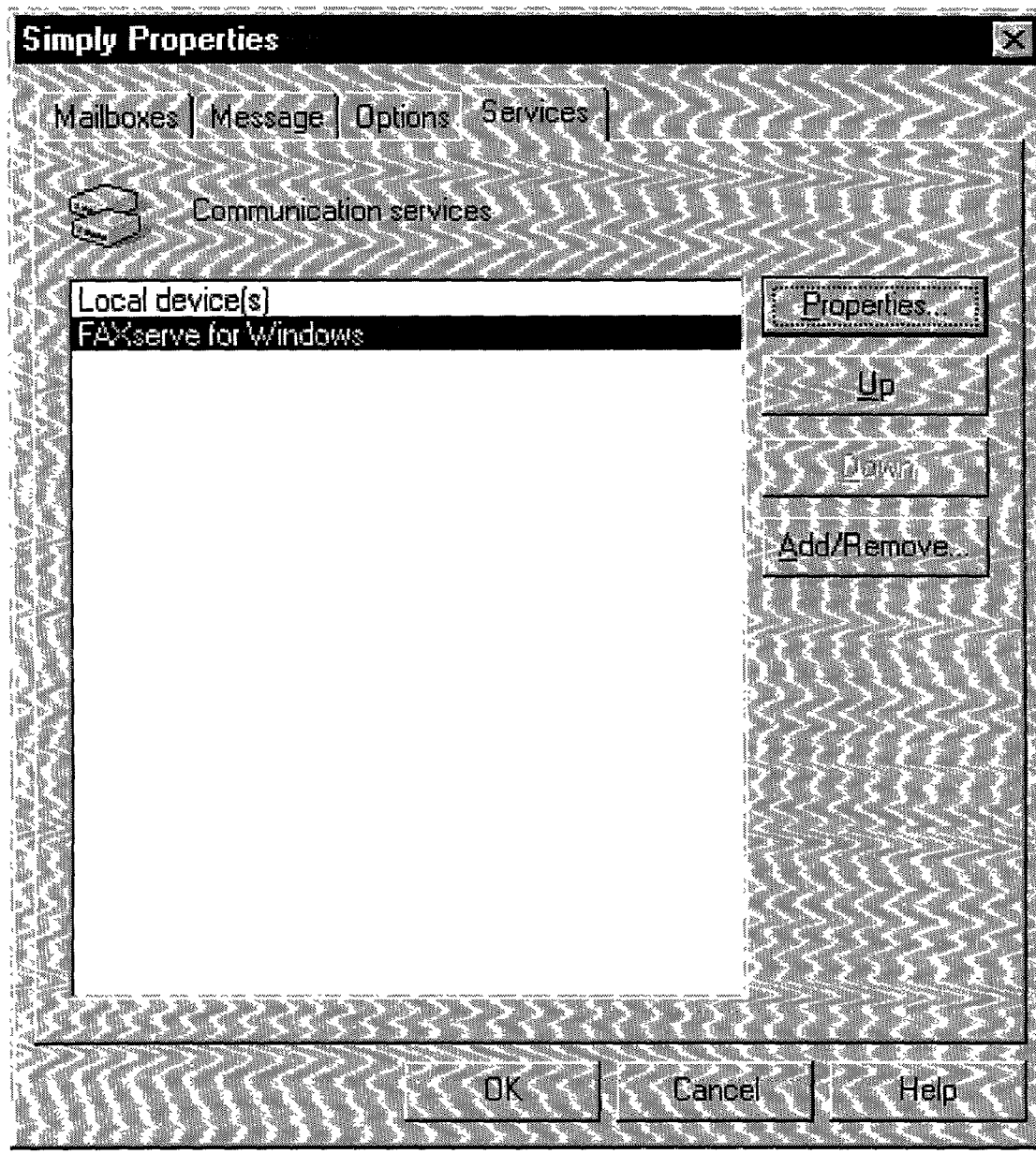
FIG. 11 is a snapshot view of a communication services properties user interface, in accordance with an embodiment of the present disclosure.
Figure 12:
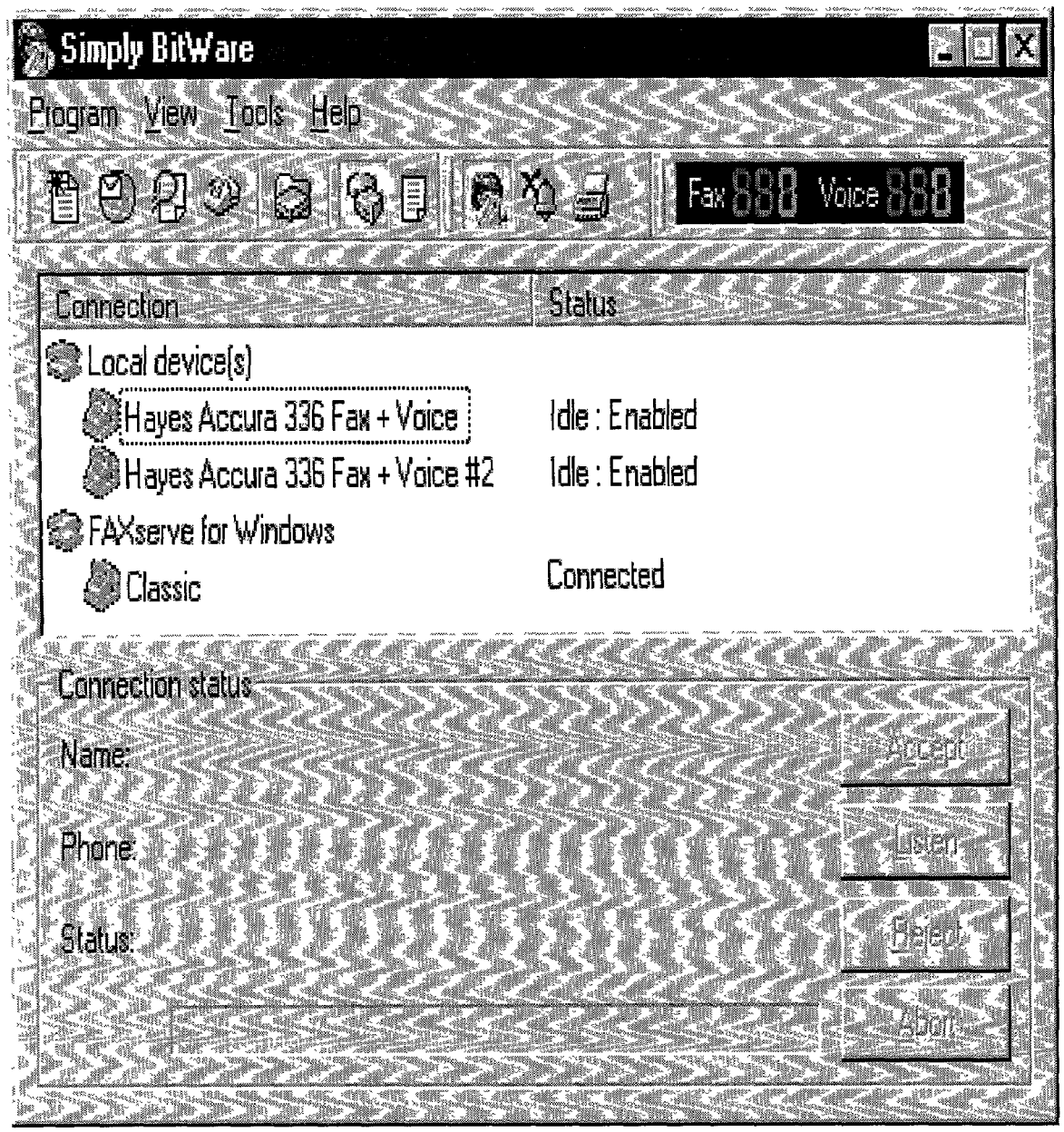
FIG. 12 is a snapshot view of a status monitor user interface, in accordance with an embodiment of the present disclosure.
Figure 13:
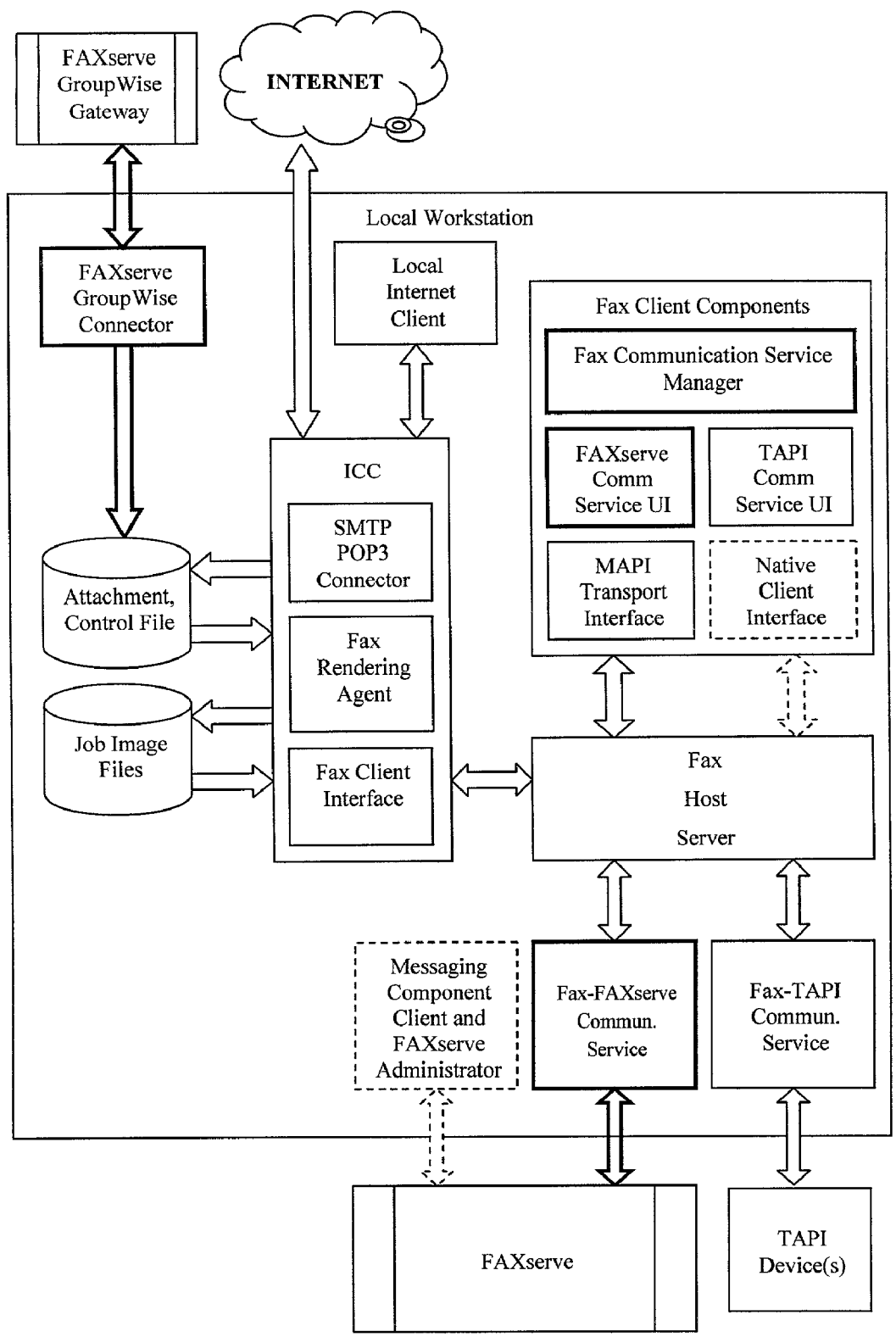
FIG. 13 is a block diagram showing an example of integration of a native messaging client with fax services, in accordance with an embodiment of the present disclosure.
Figure 14:
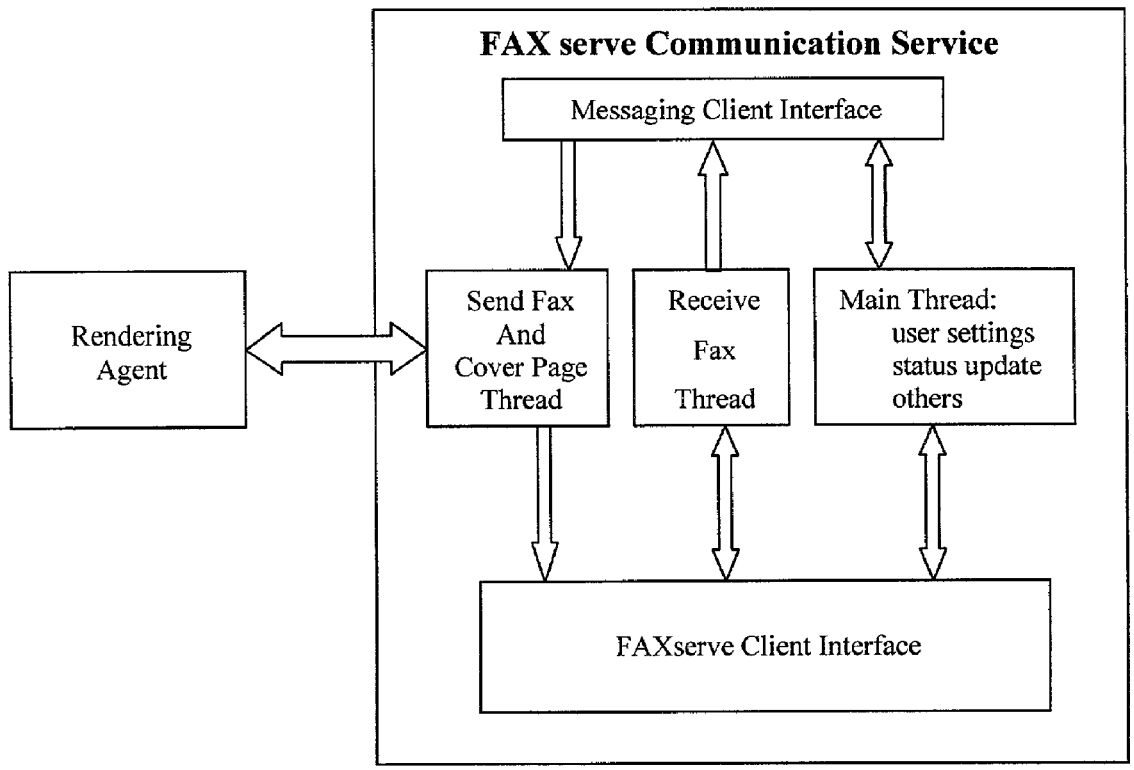
FIG. 14 is a block diagram of a fax communication service with multiple threads, in accordance with an embodiment of the present disclosure.

A standard RPC interface may be provided for different communication service plug-ins, such as TAPI devices, FAX services (discussed below), as shown for example in FIG. 11. The communication services may be selected during installation procedure. The setup process may include a device detection mechanism to support multiple communication services. The delivery priority may be based on the order of the list of services.

A status monitor provides transmission/receive status display and a user interface to access most functions provided by the Messaging Component, including properties configuration and invocation of other components. It keeps track of the message count. The property information may be invoked from menu selection. Each device may be enabled/disabled individually, as shown for example in FIG. 12.

When the status monitor starts, it may execute an auto-detection function from each communication service unless this setting for the service is disabled during installation. The service configuration may provide a pop-up user interface for configuration, if necessary, to ensure correct device configuration.

The Messaging Component may be integrated with one or more FAX services (FAXserve) as a client component. FAXserve allows users to send and receive faxes from their desktops through one of a number of available clients. A FAXserve communication service module provides direct communications between the Messaging Component and FAXserve. A property configuration user interface may be provided for the FAXserve communication service. A block diagram outlining the integration of the Messaging Component with FAXserve components is shown for example in FIG. 13.

The FAXserve communication service provides a means for direct communication between the Messaging Component and FAXserve, and may be based on a TAPI communication service (described below) as a framework. FAXserve communication service includes a Bitware client interface, which interfaces with the host server, and a FAXserve client interface, which provides a custom interface that uses APIs (application program interfaces) to communicate with the FAXserve servers. The FAXserve communication service may have a number of independent threads for each of the types of operations, as shown for example in FIG. 14.

Main Thread may handle module initialization, clean-up, FAXserve server connection, user authentication, user settings, status update, and start-up of the other threads. It also may scan for appropriate FAXserve servers based on the current connections in the workstation. It authenticates the FAXserve user/connection and initializes variables for the other threads. After it starts up the Send and Receive threads, it remains idle while waiting to service any request from the host server to provide status information or update FAXserve user information to/from its mailbox.

Receive Fax Thread polls for newly received faxes from the specific user folder in the FAXserve server. Once received faxes are detected, they may be moved from the FAXserve server through the FAXserve client interface to the local workstation user's folder, as determined by the Bitware client interface. After the fax files are copied, the FAXserve client interface removes gracefully the copy in the FAXserve server and de-allocates a job handle associated to the fax. Meanwhile, Bitware client interface fires up a new message event to notify the host server of the new arrival of fax files.

Send Fax Thread provides a means for submitting fax jobs to the connected FAXserve and polls the host server through Bitware client interface to determine if any fax jobs are ready to be serviced. It invokes a Messaging Component rendering agent to generate a cover page for the fax job. The Rendering Agent also may be used by other communication services (e.g., TAPI communication service) and the Internet client connector. After the fax job is ready, it uses the FAXserve client interface to submit the job to FAXserve.

Sender information including custom cover page information may be inside the message job itself. FAXserve communication service processes them directly to complete the job structure in order to submit to FAXserve.

Figure 15:
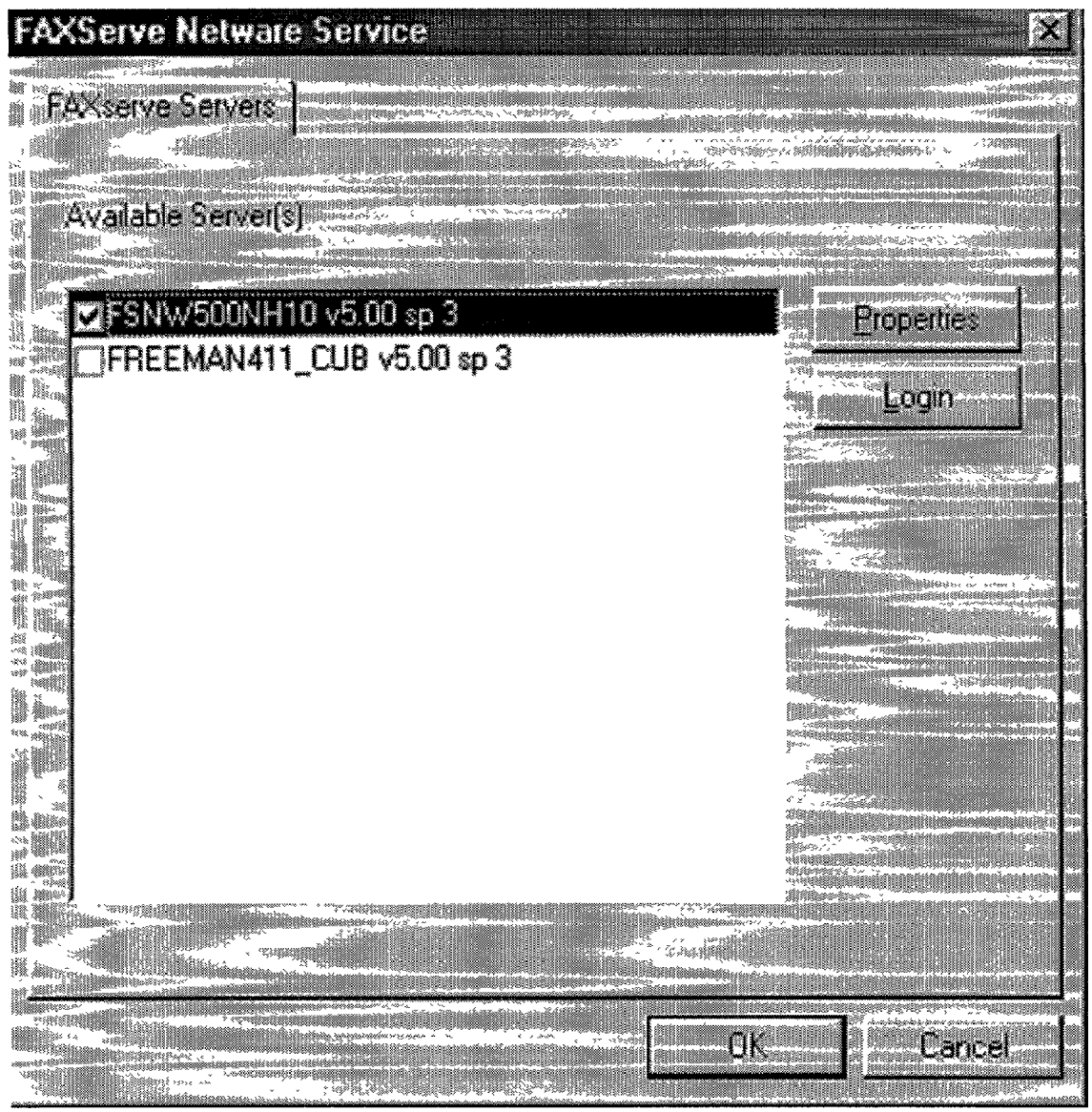
FIG. 15 is a snapshot view of a fax communication service configuration user interface, in accordance with an embodiment of the present disclosure.

A standalone DLL may be provided to the user for configuring FAXserve communication service options. When the user brings up the user interface, a list of FAXserve servers that are available, for example, as shown in FIG. 15, maybe provided. A server may be enabled by checking the box next to the server name.

Figure 16:
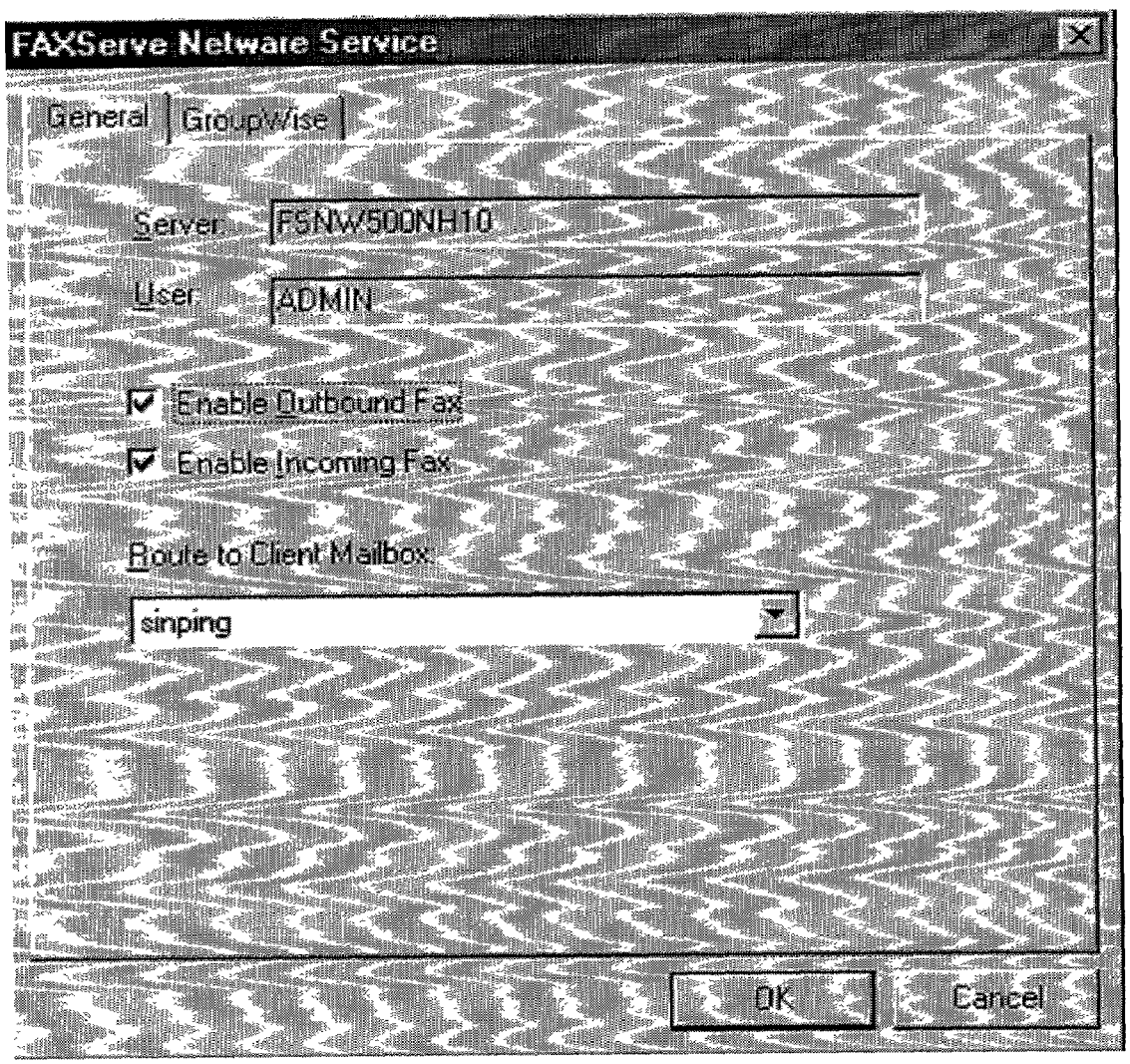
FIG. 16 is a snapshot view of a fax communication service properties user interface, in accordance with an embodiment of the present disclosure.
Figure 17:
FIG. 17 is a snapshot view of a fax communication service groupwise properties user interface, in accordance with an embodiment of the present disclosure.

A dialog box, as shown for example in FIG. 16, may be presented when the Properties button is pressed. A GroupWise connector module may be provided with the Messaging Component to handle GroupWise fax jobs. If there is an available GroupWise rendering agent for the server, the user may access the GroupWise property page as shown for example in FIG. 17.

Figure 18:
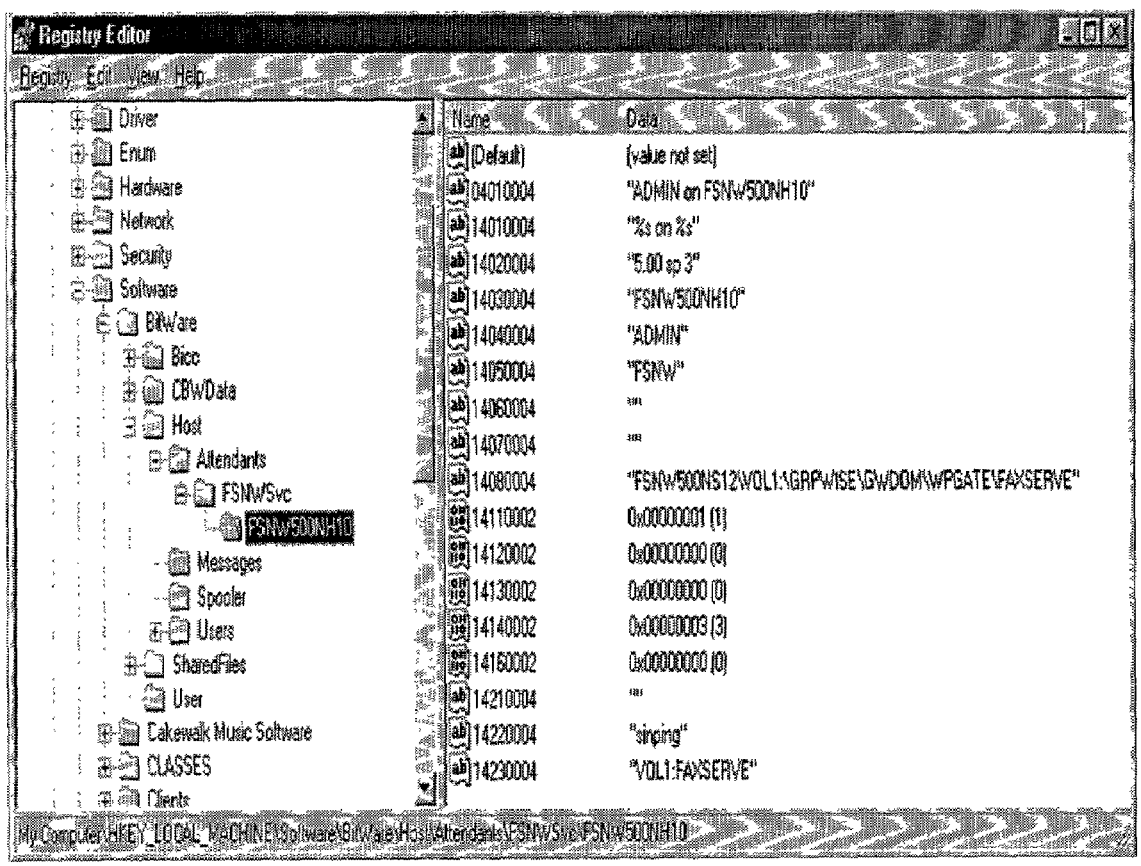
FIG. 18 is a snapshot view of a fax communication service registry editor user interface, in accordance with an embodiment of the present disclosure.
Figure 19:
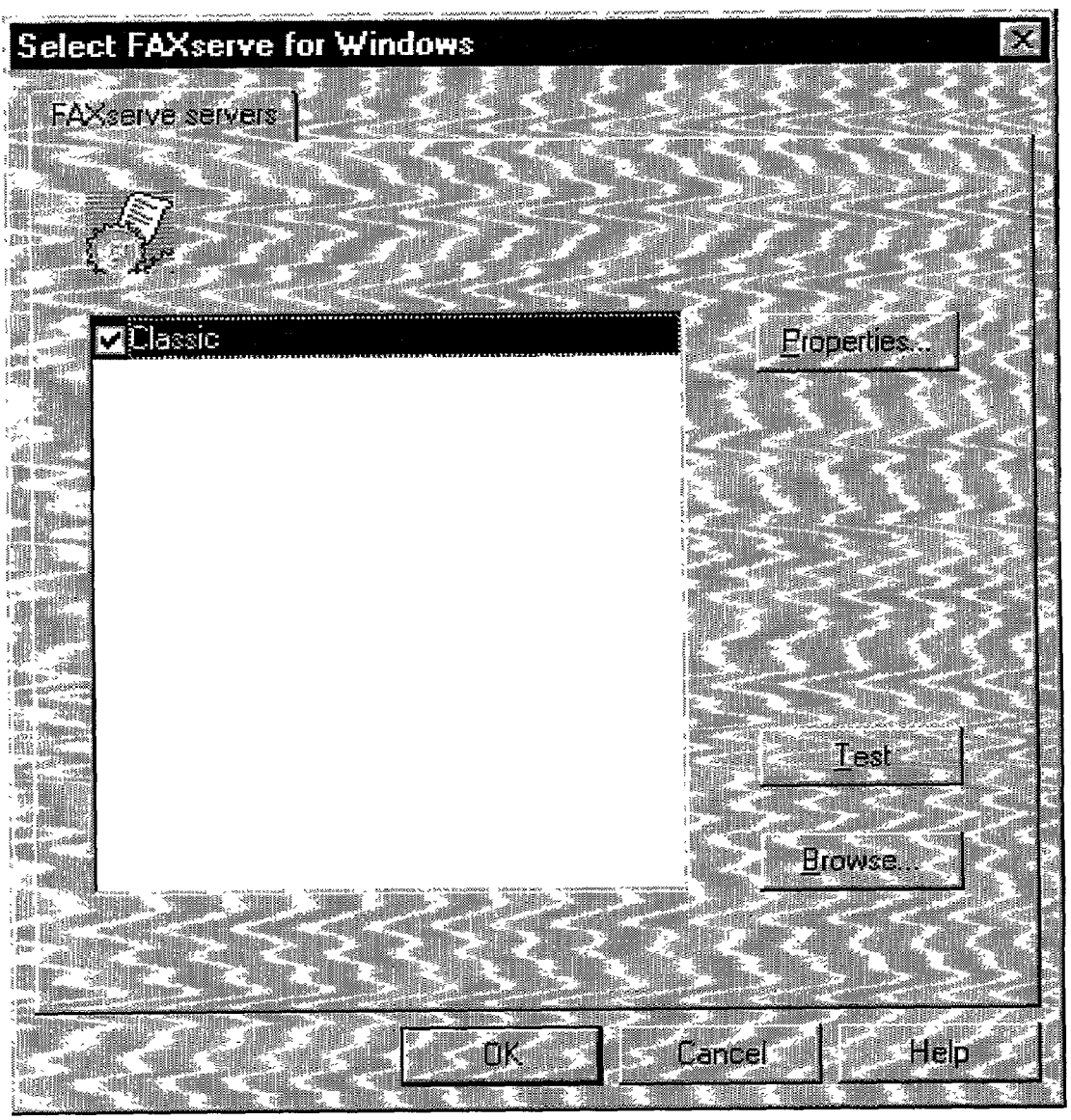
FIG. 19 is a snapshot view of a fax communication service selection user interface, in accordance with an embodiment of the present disclosure.
Figure 20:
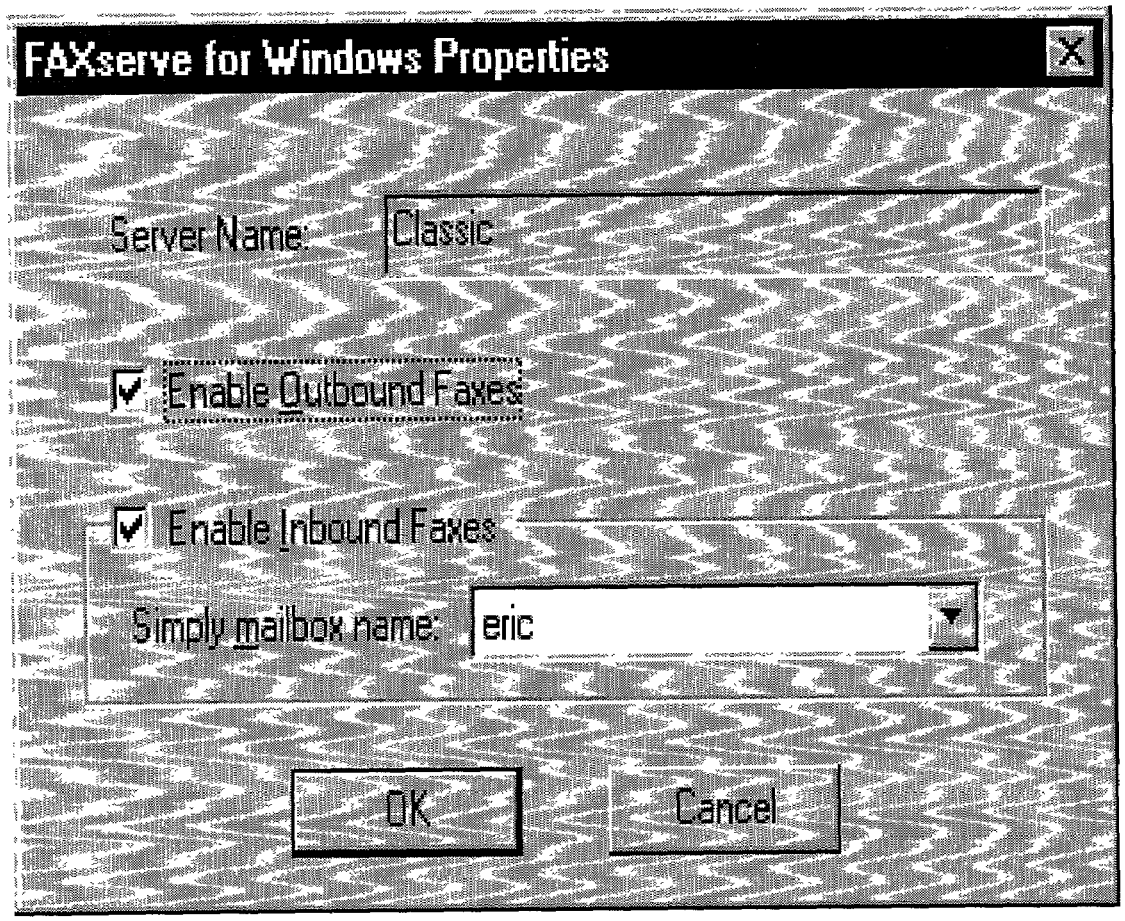
FIG. 20 is a snapshot view of a fax communication service access configuration user interface, in accordance with an embodiment of the present disclosure.

Registry entries may be accessed by the FAXserve communication service property user interface, as shown for example in FIG. 18. A list of servers maybe shown under the FAXserve service name "FSNWSVC". Some relevant registry entries may include the following shown in FIG. 18:

04010004—FAXserve display name
    14010004—FAXserve display template
    14020004—FAXserve version and service pack
    14040004—FAXserve user name
    14080004—GroupWise server name and path 14110002—FAXserve server state (e.g., active, disabled)
14120002—FAXserve status (e.g., idle, transmitting)
14140002—FAXserve options (e.g., inbound, outbound)
14160002—GroupWise server state (e.g., enabled, disabled)
14220004—BitWare mailbox name
14230004—FAXserve base directory A DLL user interface may be provided to the user for selecting/deselecting FAXserve servers. As shown for example in FIG. 19, a server may be selected by checking the box next to the server name. A dialog window, as shown for example in FIG. 20, may be provided for configuring access to the selected FAXserve server.

Figure 21:
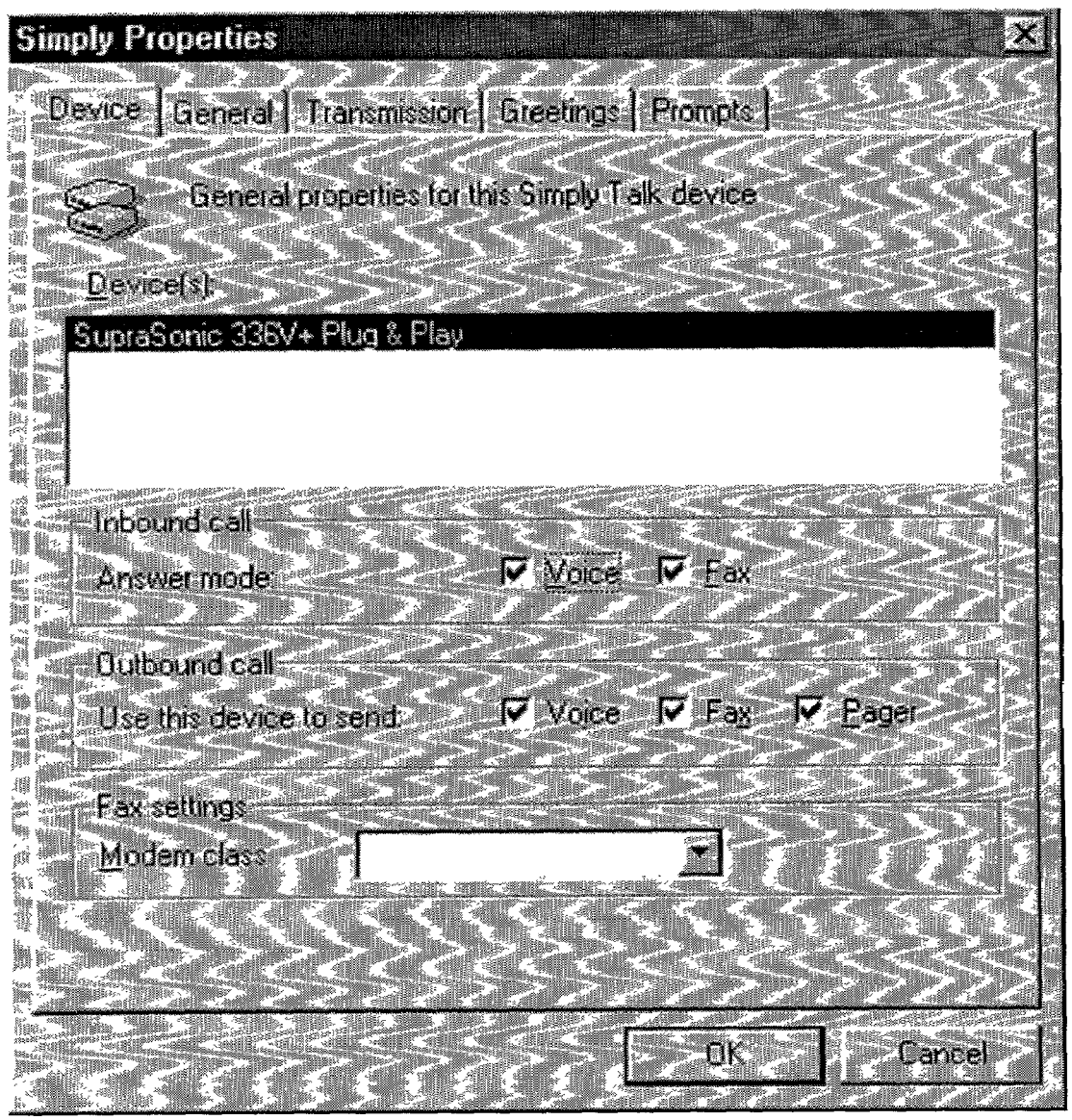
FIG. 21 is a snapshot view of a device properties user interface, in accordance with an embodiment of the present disclosure.
Figure 22:
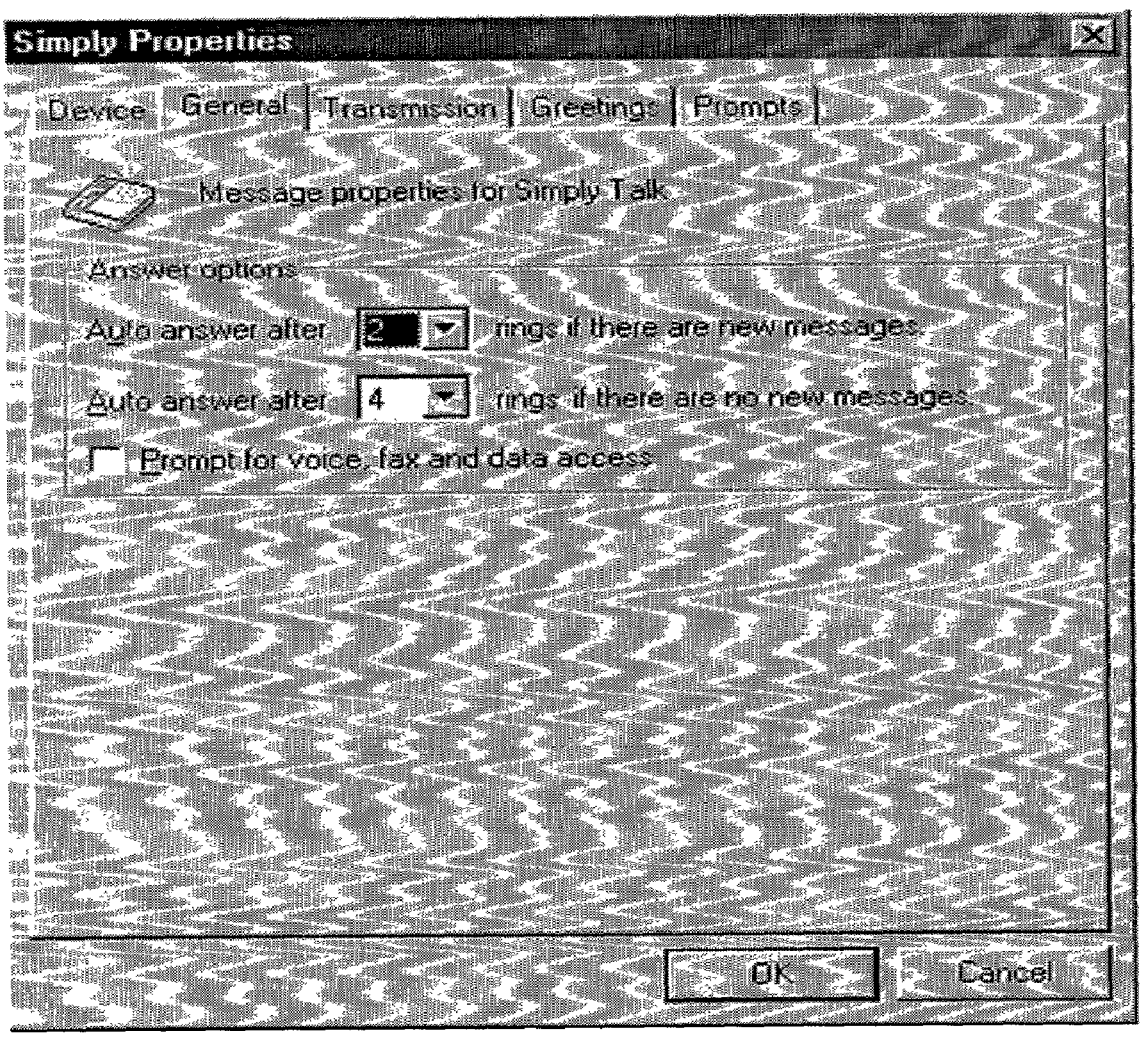
FIG. 22 is a snapshot view of a general properties user interface, in accordance with an embodiment of the present disclosure.
Figure 23:
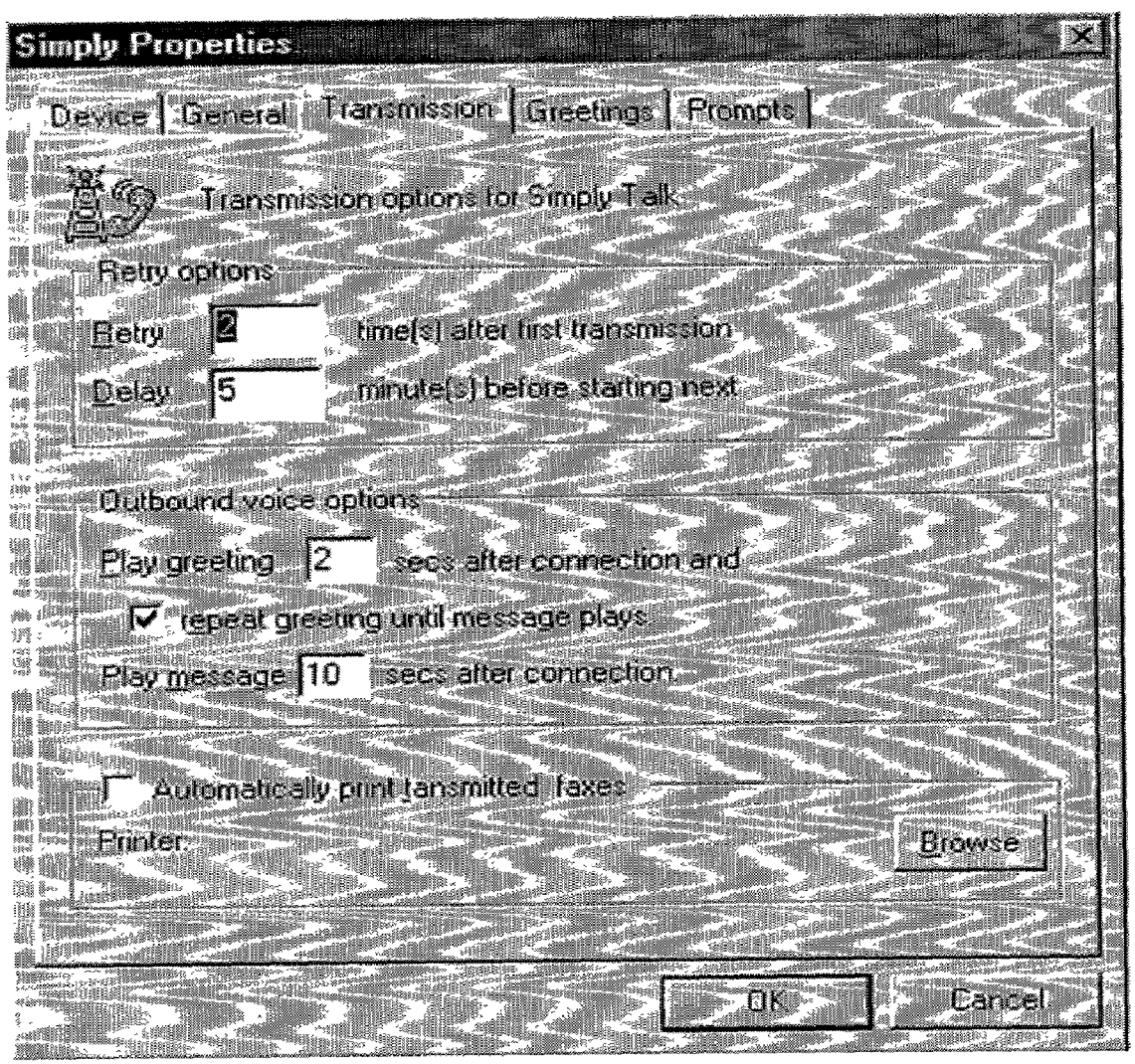
FIG. 23 is a snapshot view of a transmission properties user interface, in accordance with an embodiment of the present disclosure.
Figure 24:
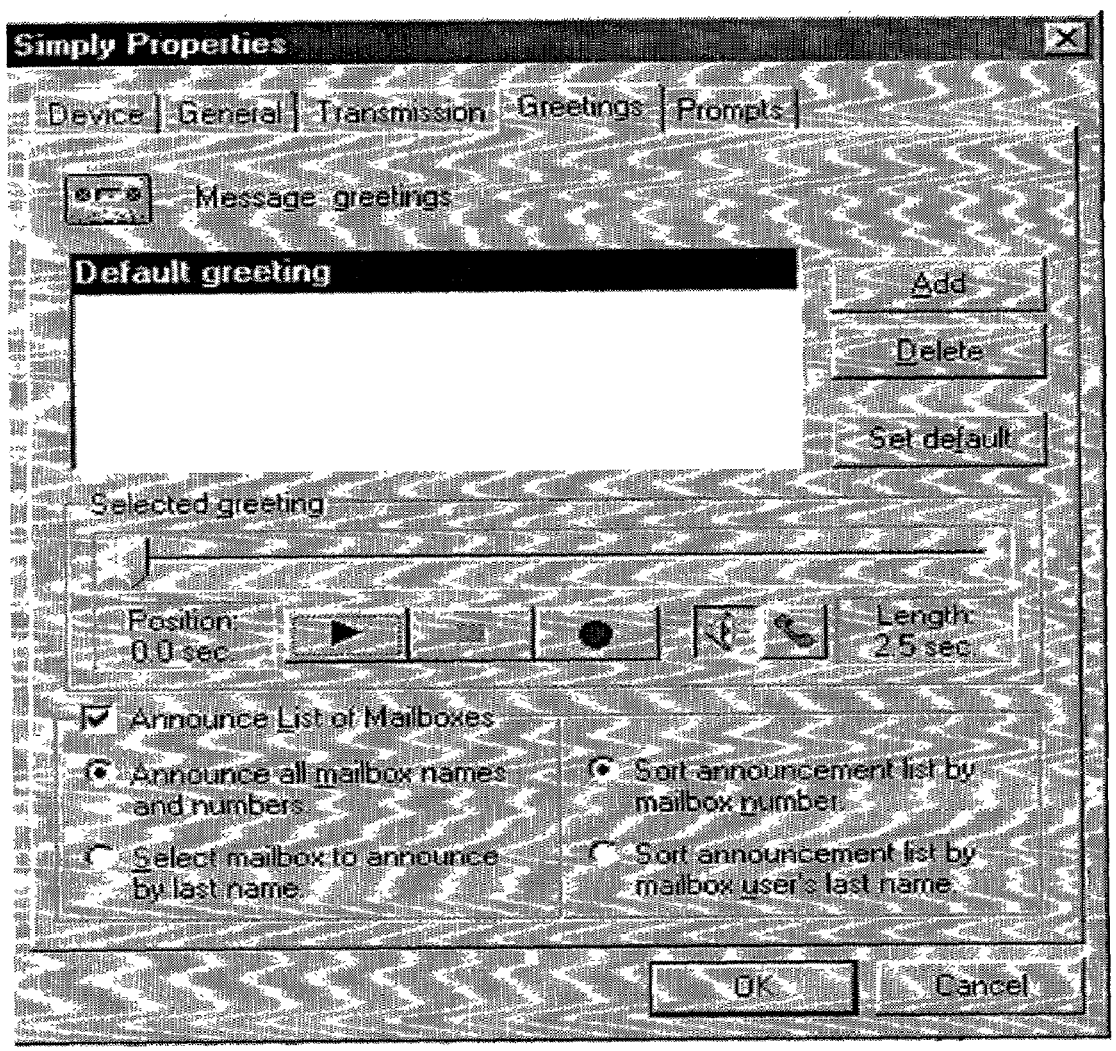
FIG. 24 is a snapshot view of a greetings properties user interface, in accordance with an embodiment of the present disclosure.
Figure 25:
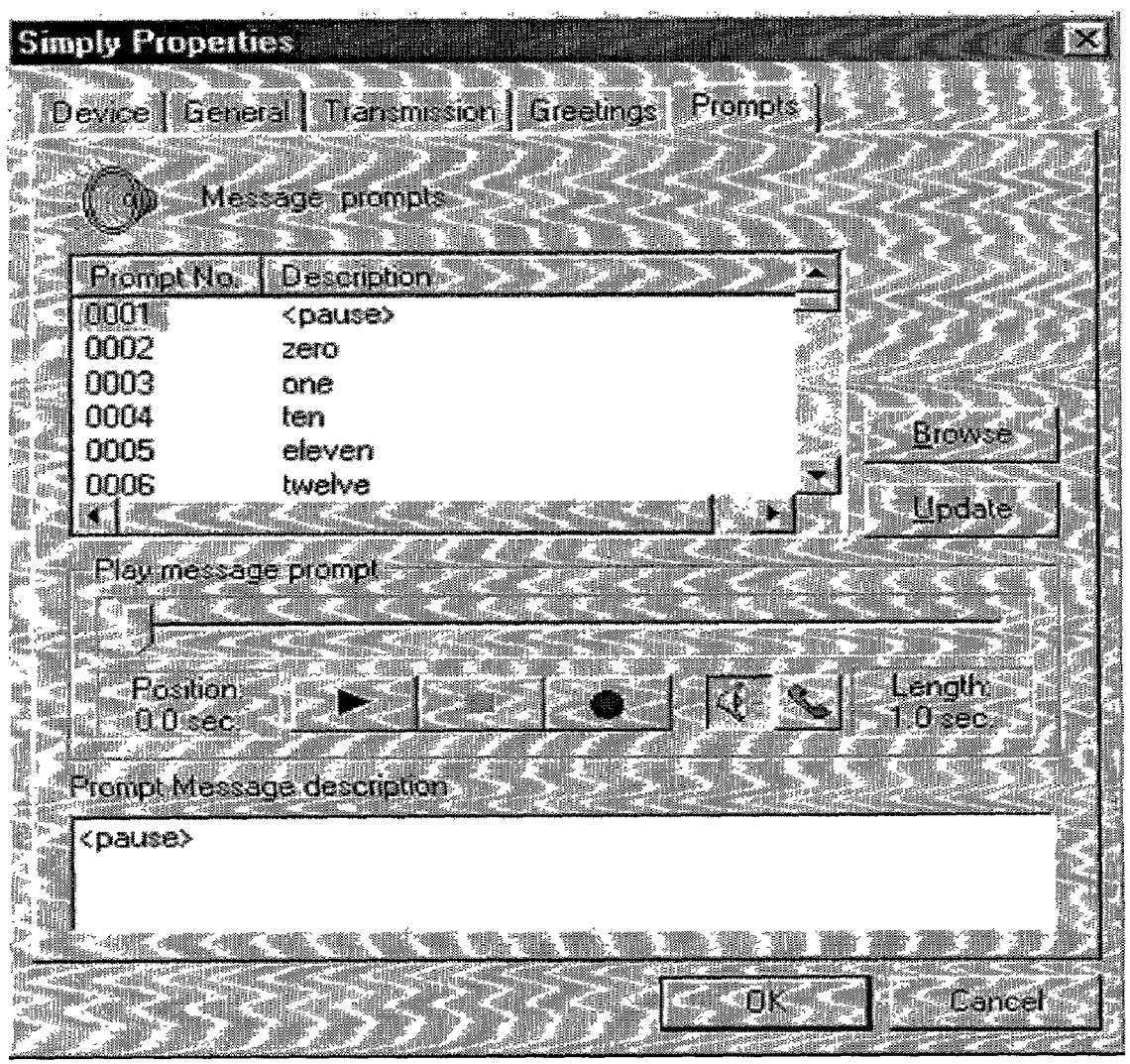
FIG. 25 is a snapshot view of a prompts properties user interface, in accordance with an embodiment of the present disclosure.

A DLL user interface, as shown for example in FIG. 21, may be provided for configuring TAPI communication service options. A General Properties page, as shown for example in FIG. 22, provides the user with means to set message properties. A Transmission page, as shown for example in FIG. 23, provides the user with means to set transmission properties such as retry times and delay time. A Greetings page, as shown for example in FIG. 24, and a Prompts page, as shown for example in FIG. 25, also may be provided optionally.

FIGS. 3–7, 11, 12, and 15–25 show snapshots of exemplary user interfaces which are adaptations of the standard user interface provisions associated with the shell interface, for message management, according to embodiments of the present disclosure. It should be apparent to one of ordinary skill in the art that many other such user interfaces are possible to support the message management features set forth in the present disclosure. For example, the following additional user interface features also may be provided: (a) add Dialer and Compose shortcuts to desktop during installation; (b) "Enter" keystroke functions like Dial/Hangup button in Dialer in appropriate situations; (c) a redial button facilitates redial to a number in a redial history log; (d) right click on redial button triggers pop-up menu showing name and number of recently dialed entries; (e) right click to message counter display control triggers display of mailbox list; (f) notify presence of new message(s), e.g., blinking system tray Messaging Component icon; (g) when user clicks forward in message client, Compose dialog opens with fax/voice/pager files attached; (h) provide indication of message waiting, e.g., generic blinking scroll lock light; (i) restrict access to secured mailboxes only with appropriate passwords; (j) provide auto-forwarding of faxes to another fax number or mailbox, and auto-forwarding of voice messages to another voice number or mailbox; (k) provide macro-based pager notification, including merging job's info with cover page, similar to fax header and cover page (support caller ID, including name, number, date, time, etc.); (l) provide callback via Dialer numbers in the call log; and (m) provide handle creation and deletion of mail accounts when creating use mailboxes under simple MAPI mode.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading U.S. provisional application Ser. No. 60/229,403, filed Aug. 31, 2000 and entitled "METHOD AND SYSTEM FOR SENDING, RECEIVING AND MANAGING MESSAGING DATA", which is incorporated herein by reference.

What is claimed is:

1. A method of sending, receiving and managing messaging data comprising:
    installing a messaging component module into a shell interface to a computer operating system of a computer, the shell interface comprising logical and virtual references to components on the computer;
    displaying at least one messaging entry through the shell interface, the displayed messaging entry identifying received faxes, voicemails and/or pager messages; and
    invoking an appropriate communication service for accessing a selected one of the received faxes, voicemails and pager messages, wherein the selected message is selected through the shell interface.

2. The method of claim 1, further comprising displaying a second messaging entry through the shell interface, wherein the second messaging entry identifies sent faxes, voicemails and/or pager messages.

3. The method of claim 1, further comprising displaying a second messaging entry through the shell interface, wherein the second messaging entry identifies outgoing faxes, voicemails and/or pager messages.

4. The method of claim 1, further comprising displaying a second messaging entry through the shell interface, wherein the second messaging entry provides contact data.

5. The method of claim 1, wherein the messaging component module installs a messaging shell namespace.

6. The method of claim 1, wherein the messaging component module adds a compose message user interface accessible through the shell interface.

7. The method of claim 1, wherein the messaging component module adds a status monitor user interface accessible through the shell interface.

8. The method of claim 1, wherein the messaging component module adds a messaging properties user interface accessible through the shell interface for managing mailboxes.

9. The method of claim 8, wherein the user interface provides means for viewing and changing settings for the mailboxes.

10. The method of claim 1, wherein the communication service comprises a voice message viewer.

11. The method of claim 1, wherein the communication service comprises a pager message viewer.

12. The method of claim 1, wherein the communication service comprises a fax message viewer.

13. The method of claim 1, wherein the messaging component module is maintained in a dynamic link library.

14. The method of claim 1, wherein the displayed messaging entry shows that a received fax, voicemail and/or pager message is an attachment to an e-mail message.

15. A program storage device readable by a machine, tangibly embodying a program of instructions executable by the machine to perform a method for sending, receiving and managing messaging data, the method comprising:
    installing a messaging component module into a shell interface to a computer operating system of a computer, the shell interface comprising logical and virtual references to components on the computer;
    displaying at least one messaging entry through the shell interface, the displayed messaging entry identifying received faxes, voicemails and/or pager messages; and
    invoking an appropriate communication service for accessing a selected one of the received faxes, voicemails and pager messages, wherein the selected message is selected through the shell interface.

16. The program storage device of claim 15, the method further comprising displaying a second messaging entry through the shell interface, the second messaging entry identifying sent faxes, voicemails and/or pager messages.

17. A computer data signal embodied in a transmission medium which embodies instructions executable by a computer to send, receive and manage messaging data, comprising:
   a first segment including comprising installation code to install a messaging component module into a shell interface to a computer operating system of a computer, the shell interface comprising logical and virtual references to components on the computer;
   a second segment comprising message management code in the messaging component module to display at least one messaging entry through the shell interface, the displayed messaging entry identifying received faxes, voicemails and/or pager messages;and
   a third segment comprising service invocation code to invoke an appropriate communication service for accessing a selected one of the received faxes, voicemails and pager messages, wherein the selected message is selected through the shell interface.

18. The computer data signal of claim 17, wherein a second messaging entry is displayed through the shell interface, the second messaging entry identifying sent faxes, voicemails and/or pager messages.

19. A system for sending, receiving and managing messaging data, comprising:
   a plurality of communication services providing fax, voicemail and/or pager messaging services;
   at least one messaging client having a shell interface to a computer operating system of a computer, the shell interface with a messaging component module operable to display at least one messaging entry through the shell interface, wherein the displayed messaging entry identifies received faxes, voicemails and/or pager messages, wherein one of the received faxes, voicemails and pager messages is selected through the shell interface, and a particular one of the communication services is invoked by the messaging client for accessing the selected message; and
   a host server providing an interface between the at least one messaging client and the plurality of communication services.

20. The system of claim 19, wherein a second messaging entry is displayed through the shell interface, the second messaging entry identifying sent faxes, voicemails and/or pager messages.

* * * * *